(12) United States Patent
Nakano et al.

(10) Patent No.: US 9,660,699 B2
(45) Date of Patent: May 23, 2017

(54) DETECTION APPARATUS, ELECTRIC POWER RECEIVING APPARATUS, ELECTRIC POWER TRANSMISSION APPARATUS, WIRELESS ELECTRIC POWER TRANSMISSION SYSTEM, AND DETECTION METHOD

(71) Applicant: Sony Corporation, Tokyo (JP)

(72) Inventors: Hiroaki Nakano, Tokyo (JP); Takaaki Hashiguchi, Tokyo (JP); Shinichi Fukuda, Kanagawa (JP); Kenichi Fujimaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/068,049

(22) Filed: Mar. 11, 2016

(65) Prior Publication Data

US 2016/0197493 A1 Jul. 7, 2016

Related U.S. Application Data

(63) Continuation of application No. 13/551,861, filed on Jul. 18, 2012.

(30) Foreign Application Priority Data

Jul. 25, 2011 (JP) .................. 2011-162589

(51) Int. Cl.
*G01R 31/40* (2014.01)
*H04B 5/00* (2006.01)
(Continued)

(52) U.S. Cl.
CPC ............ *H04B 5/0037* (2013.01); *H02J 5/005* (2013.01); *H02J 7/025* (2013.01); *H02J 50/60* (2016.02)

(58) Field of Classification Search
CPC ........ H04B 5/0037; H02J 5/005; H02J 50/60; H02J 7/025
See application file for complete search history.

(56) References Cited

U.S. PATENT DOCUMENTS 3,163,818 A 12/1964 Spaven
4,937,995 A 7/1990 Deffeyes
(Continued)

FOREIGN PATENT DOCUMENTS

CN 103765728 4/2014
EP 1 368 990 B1 7/2007
(Continued)

OTHER PUBLICATIONS

Simple Series Resonance, Resonance Electronics Textbook, Chapter 6 Resonance, p. 5, accessed online at http://www.allaboutcircuits.com/textbook/alternatingcurrent/chpt6/simpleseriesresonance/ on Jul. 21, 2016.*

(Continued)

*Primary Examiner* — Daniel Miller
(74) *Attorney, Agent, or Firm* — Michael Best & Friedrich LLP

(57) ABSTRACT

A method for wireless power transmission includes obtaining, via a Q-value circuit, first and second voltages at respective first and second nodes of a resonance circuit. The first and second voltages are effective to determine if foreign matter is present in a space affecting wireless power transmission. The method includes controlling a switching section between the Q-value circuit and the resonance circuit such that at least a part of the electric power transmission process occurs at a different time than when the first and second voltages are obtained.

17 Claims, 20 Drawing Sheets

(51) Int. Cl.
  *H02J 5/00* (2016.01)
  *H02J 50/60* (2016.01)
  *H02J 7/02* (2016.01)

(56) References Cited

U.S. PATENT DOCUMENTS

| | | |
|---|---|---|
| 2010/0109445 A1 | 5/2010 | Kurs |
| 2010/0320962 A1 | 12/2010 | Sekita et al. |
| 2011/0074346 A1 | 3/2011 | Hall |
| 2012/0169136 A1 | 7/2012 | Lisi |

FOREIGN PATENT DOCUMENTS

| | | |
|---|---|---|
| GB | 1368990 | 10/1974 |
| JP | H01-132944 A | 5/1989 |
| JP | 03-075574 | 3/1991 |
| JP | 2001-275280 | 10/2001 |
| JP | 2002-334310 | 11/2002 |
| JP | 2007-060416 | 3/2007 |
| JP | 2007-537688 A | 12/2007 |
| JP | 2008-206231 | 9/2008 |
| JP | 2009115537 A | 5/2009 |
| JP | 2010028935 A | 2/2010 |
| JP | 2010-119246 A | 5/2010 |
| JP | 2010216863 | 9/2010 |
| JP | 2011030404 A | 2/2011 |
| JP | 2012-504378 A | 2/2012 |
| JP | 2013017336 A | 1/2013 |
| JP | 2013543719 A | 12/2013 |
| WO | WO-2010/036980 A1 | 4/2010 |
| WO | WO-2012/047779 A1 | 4/2012 |
| WO | WO-2013-005860 | 1/2013 |

OTHER PUBLICATIONS

Extended European Search Report issued Oct. 26, 2015, for corresponding European Application No. 12005266.7.
Bakshi et al., Electronic Measurements, First Edition, 2008, sections 1.3, 1.4.
European Search Report corresponding to European Serial No. 12005266 dated Jul. 17, 2015.
Chinese Office Action corresponding to Chinese Serial No. 2012102495832 dated Jun. 30, 2015.
Japanese Office Examination Report issued in connection with related Japanese Patent Application No. JP 2011-162589 dated Feb. 10, 2015.
Japanese Office Action issued Aug. 16, 2016 for corresponding Japanese Application No. 2015-222449.
Japanese Office Action issued Aug. 16, 2016 for corresponding Japanese Application No. 2015-222449 (Previously Submitted on Aug. 30, 2016).

* cited by examiner

DETECTION APPARATUS, ELECTRIC POWER RECEIVING APPARATUS, ELECTRIC POWER TRANSMISSION APPARATUS, WIRELESS ELECTRIC POWER TRANSMISSION SYSTEM, AND DETECTION METHOD

CROSS REFERENCE TO RELATED APPLICATIONS

The present application is a Continuation of application Ser. No. 13/551,861, filed Jul. 18, 2012, which claims the benefit of Japanese Priority Patent Application JP 2011-162589 filed Jul. 25, 2011, the entire contents of which are incorporated herein by reference.

BACKGROUND

The present disclosure relates to a detection apparatus, an electric power receiving apparatus, an electric power transmission apparatus, a wireless electric power transmission system, and a detection method that detect the presence of a conductor, such as a metal.

In recent years, the development of non-contact electric power transmission systems that supply electric power in a non-contact manner (wireless electric power supply) has been increasingly performed. Methods of realizing wireless electric power supply broadly include two types of techniques.

One of the techniques is an already widely used electromagnetic induction method, in which the degree of coupling between the electric power transmission side and the electric power receiving side is very high, and electric power supply is possible at high efficiency. However, it is necessary to maintain a coupling coefficient between the electric power transmission side and the electric power receiving side. Consequently, in a case where the electric power transmission side and the electric power receiving side are spaced apart from each other or in a case where there is a positional displacement, the electric power transmission efficiency (hereinafter referred to as an "inter-coil efficiency") between the coil of the electric power transmission side and the coil of the electric power receiving side is greatly deteriorated.

The other technique is a technique called a magnetic-field resonance method in which a resonance phenomenon is actively used and thus, the magnetic flux shared by the electric power supply source and the electric power supply destination may be small. In the magnetic-field resonance method, even when the coupling coefficient is small, if the Q value (Quality factor) is high, inter-coil efficiency does not deteriorate. The Q value is an index (indicating the strength of the resonance of the resonance circuit) representing the relationship between the retention and the loss of energy of the circuit having the coil of the electric power transmission side or the electric power receiving side. That is, axial alignment between the electric power transmission side coil and the electric power receiving side coil is unnecessary, and there is advantage that the degree of freedom of the position and the distance of the electric power transmission side and the electric power receiving side is high.

In a non-contact or wireless electric power transmission system, an important element is one for heat generation countermeasures for metal foreign matter. Not limited to the electromagnetic induction method or the magnetic-field resonance method, when electric power supply is to be performed in a non-contact manner, in the case where a metal is present between the electric power transmission side and the electric power receiving side, an eddy current is generated, and there is a risk that the metal will generate heat. In order to reduce this heat generation, many techniques for detecting metal foreign matter have been proposed. For example, a technique using a light sensor or a temperature sensor is popular. However, in the detection method using a sensor, costs are incurred in a case where the electric power supply range is wide as in the magnetic-field resonance method. Furthermore, in the case of, for example, a temperature sensor, since the output result of the temperature sensor depends on the thermal conductivity in the surroundings thereof, design restrictions are imposed on the devices on the transmission side and on the reception side.

Therefore, a technique has been proposed in which the presence or absence of metal foreign matter is determined by observing a change in parameters (electric current, voltage, etc.) when metal foreign matter enters the space between the electric power transmission side and the electric power receiving side. With such a technique, it is not necessary to impose design restrictions, and costs can be reduced. For example, in Japanese Unexamined Patent Application Publication No. 2008-206231, a method of detecting metal foreign matter by using the degree of modulation at the time of communication between an electric power transmission side and an electric power receiving side has been proposed. In Japanese Unexamined Patent Application Publication No. 2001-275280, a method (foreign matter detection by DC-DC efficiency) of detecting metal foreign matter using eddy current loss has been proposed.

SUMMARY

However, in the techniques proposed by the Japanese Unexamined Patent Application Publication Nos. 2008-206231 and 2001-275280, the influence of the metal housing on the electric power receiving side is not taken into consideration. In a case where charging of a typical portable device is considered, there is a high probability that some sort of metal (metal housing, metal parts, etc.) is used in the portable device and thus, distinction of whether a change in the parameter is caused by the "influence of a metal housing or the like" or by a "mixture of metal foreign matter" is difficult. When Japanese Unexamined Patent Application Publication No. 2001-275280 is used as an example, it is difficult to determine whether the eddy current loss is generated in the metal housing of the portable device or the eddy current loss is generated as a result of metal foreign matter being mixed in between the electric power transmission side and the electric power receiving side. As described above, it is difficult to say that the techniques that have been proposed in Japanese Unexamined Patent Application Publication Nos. 2008-206231 and 2001-275280 are able to detect metal foreign matter with high accuracy.

It is desirable to improve the accuracy of the detection of metal foreign matter, which is present between an electric power transmission side and an electric power receiving side.

In an embodiment of the present disclosure, at the time of measurement of a Q value, the circuit configuration of a resonance circuit including at least an inductor (e.g., coil) and a capacitor, which are included in an electric power transmission apparatus or an electric power receiving apparatus constituting a wireless (or non-contact) electric power transmission system, is switched from the circuit configuration at the time of electric power supply, so that the electrostatic capacitance value of the electrostatic capacitance components parallel to the coil is increased. Then, after the circuit configuration is switched, the Q value of the resonance circuit is measured.

According to the embodiment of the present disclosure, the electrostatic capacitance value of the electrostatic capacitance components parallel to the coil increases, and the impedance of the resonance circuit increases. As a result, the amplitude level of the voltage that is detected from the resonance circuit at the time of the measurement of the Q value increases, and the SN ratio of the Q value of the resonance circuit is improved.

According to the present disclosure, by individually configuring the resonance circuit at the time of electric power supply and the resonance circuit at the time of detection of metal foreign matter by the Q value measurement most appropriately, it is possible to improve the accuracy of the detection of metal foreign matter without deteriorating electric power supply performance.

DETAILED DESCRIPTION OF EMBODIMENTS

Figure 1:
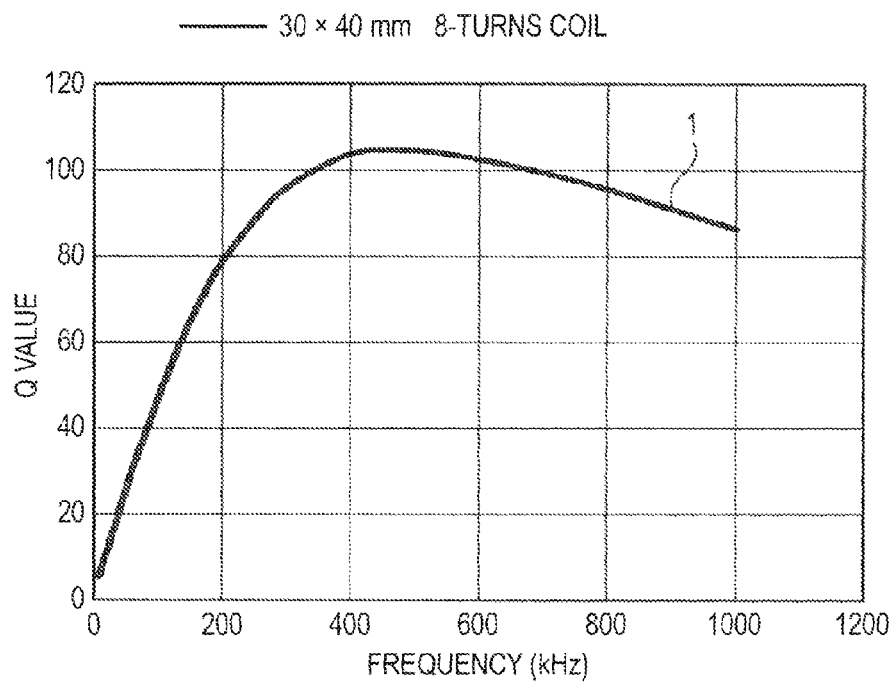
FIG. 1 is a graph illustrating an example of the relationship between frequency and a Q value.

Embodiments of the present disclosure will be described below with reference to the attached drawings. In the present disclosure and the drawings, components having substantially the same functions or configuration are designated with the same reference numerals, and duplicate descriptions thereof are omitted.

The description will be given in the following order.
1. First Embodiment (circuit switching unit: example in which electrostatic capacitance value of capacitor is switched between electric power supply time and Q value measurement time on electric power receiving side) 2. Second Embodiment (circuit switching unit: example in which electrostatic capacitance value of capacitor is switched between electric power supply time and Q value measurement time on electric power transmission side) 3. Others (Q value measurement circuit: modification of Q value measurement process)

1. First Embodiment

Introductory Description

The technology for detecting metal foreign matter in the present disclosure is a technique of detecting metal foreign matter by using a change in Q value described above. The Q value is an index indicating the relationship between the retention and the loss of energy, and is generally used as a value indicating the acuteness (strength of resonance) of the peak of the resonance of a resonance circuit. The term metal foreign matter refers to a conductor, such as a metal, which is present between the electric power transmission side (primary side) and the electric power receiving side (secondary side), and the conductor includes conductors in a wide sense, which may include, for example, semiconductors.

However, in this technique, it is necessary that the adjustment of a resonance point (resonance frequency) be performed at a place having a certain Q value. For this reason, in a case where electric power supply is performed using an alternating-current signal of a frequency having a low Q value as in a typical electromagnetic induction method, the absolute value of the Q value is low and thus, detection accuracy is deteriorated. Therefore, care should be exercised regarding such usage.

FIG. 1 illustrates an example of the relationship between frequency and a Q value associated with a coil.

The configuration of the coil used for measurements has 8 turns having an outer shape of 30.times.40 mm and an inner diameter of 20.times.30 mm. As shown in FIG. 1, the Q value indicated by a Q value frequency characteristic curve 1 markedly changes with the frequency. If this coil is used for electric power supply at 100 kHz (resonance is made by capacitor), the absolute value of the Q value becomes about 50, and the Q value becomes approximately half or less in comparison with the frequency of the maximum value.

Figure 2:
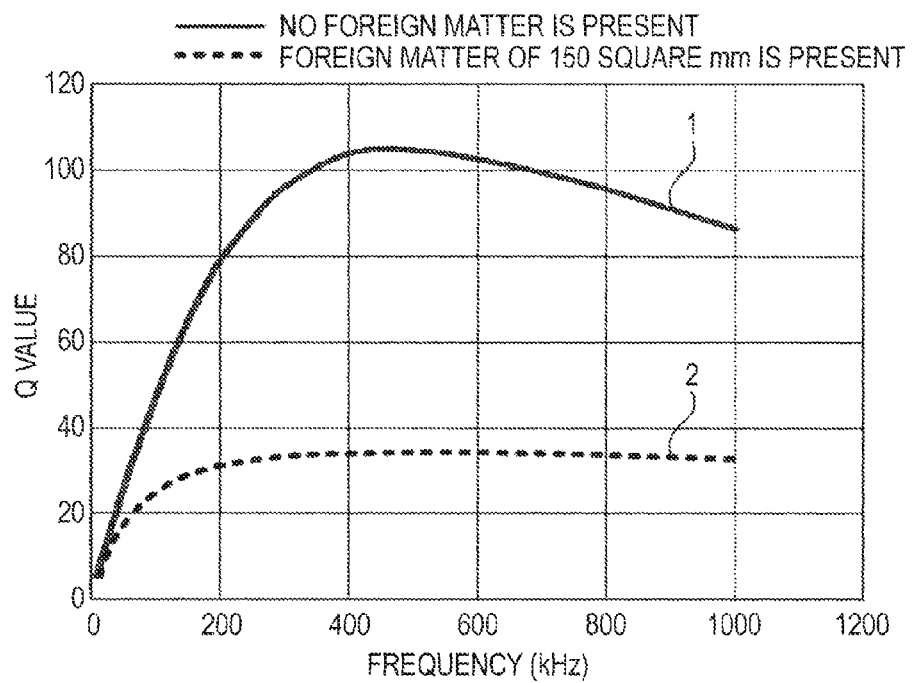
FIG. 2 is a graph in which a Q value is compared for each frequency in a case where metal foreign matter is present and in a case where metal foreign matter is not present.

FIG. 2 is a graph in which a Q value is compared for each frequency in a case where metal foreign matter is present (e.g., mixed in with a coil) and in a case where the metal foreign matter is not present (e.g., not mixed in with the coil).

In this example, a Q value when a 15-mm square of iron was placed as metal foreign matter in the center of the coil was measured. It can be seen from FIG. 2 that at a frequency with a higher Q value, the difference between a Q value frequency characteristic curve 2 when metal foreign matter is present (e.g., mixed in) and the Q value frequency characteristic curve 1 when the metal foreign matter is not present (e.g., not mixed) is greater.

Figure 3:
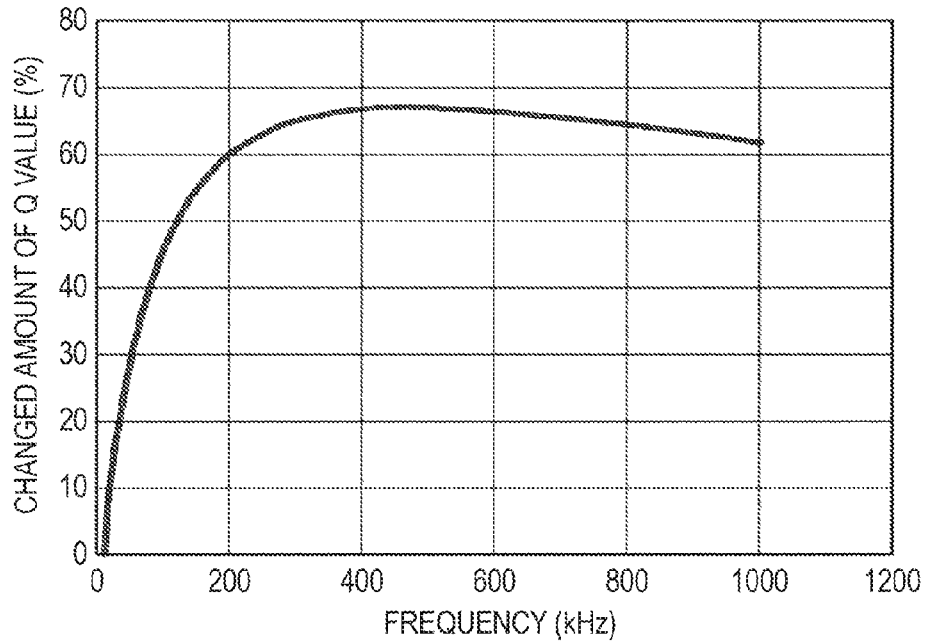
FIG. 3 is a graph illustrating the relationship between frequency and the amount of change in a Q value in a case where metal foreign matter present and in a case where metal foreign matter is not present.

FIG. 3 is a graph illustrating the relationship between frequency and the amount of change in a Q value in a case where metal foreign matter is mixed in and in a case where metal foreign matter is not mixed in. This shows the difference in Q value for each frequency, shown in FIG. 2, as a relative value.

It can be seen from FIG. 3 that the change in the Q value is markedly affected by the frequency, and it can be seen from FIGS. 2 and 3 that for a frequency at which the absolute value of the Q value is larger, the change in the Q value is larger. That is, by detecting metal foreign matter by using a frequency having a large absolute value of the Q value, the accuracy of detection of metal foreign matter is improved.

Principles of Q Value Measurement

Here, a description will be given, with reference to FIG. 4, of the principles of Q value measurement.

Figure 4:
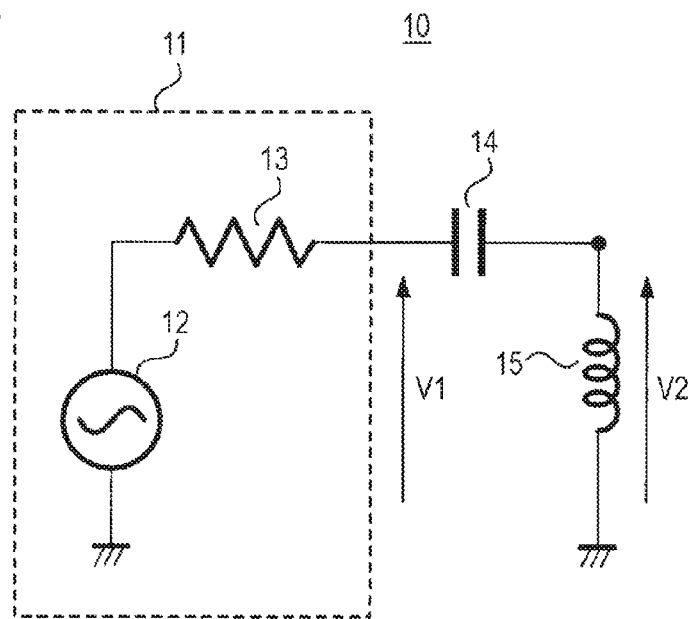
FIG. 4 is a circuit diagram illustrating an overview of an electric power transmission apparatus used for a wireless or non-contact electric power transmission system.

FIG. 4 is a circuit diagram illustrating an overview of an electric power transmission apparatus used for a non-contact electric power transmission system. The circuit of an electric power transmission apparatus 10 shown in FIG. 4 is an example of the most basic circuit configuration (in the case of magnetic field coupling) representing the principles of measurement of a Q value. Although a circuit including a series resonance circuit is illustrated, various detailed exemplary configurations can be considered as long as the function of the resonance circuit is included. The Q value measurement of the resonance circuit is a technique that is also used for a measuring instrument (LCR meter). Although an example of the resonance circuit of the electric power transmission apparatus (primary side) is illustrated, the measurement principles can be applied in the same way to the resonance circuit of the electric power receiving apparatus (secondary side).

For example, if there is a metal piece acting as metal foreign matter near the primary side coil 15 of the electric power transmission apparatus 10, a magnetic line passes through the metal piece, and an eddy current is generated in the metal piece. When viewed from the primary side coil 15, this appears that the metal piece and the primary side coil 15 are electromagnetically coupled with each other, and a real resistance load is added to the primary side coil 15, causing the Q value of the primary side to be changed. The measurement of the Q value leads to the detection of the metal foreign matter (electromagnetically coupled state) near the primary side coil 15.

The electric power transmission apparatus 10 includes a signal source 11 including an AC power supply 12 for generating an alternating-current signal (sine wave) and a resistance element 13, a capacitor 14, and a primary side coil 15 (electric power transmission coil, an example of a coil). The resistance element 13 is a schematic representation of the internal resistance (output impedance) of the AC power supply 12. The capacitor 14 and the primary side coil 15 are connected to the signal source 11 in such a manner as to form a series resonance circuit (an example of resonance circuit). Then, in order that resonance is made at a frequency desired to be measured, the value (C value) of the capacitance of the capacitor 14 and the value (L value) of the inductance of the primary side coil 15 are adjusted. The electric power transmission unit including the signal source 11 and the capacitor 14 transmits electric power to the outside through the primary side coil 15 by using a load modulation method in a wireless or non-contact manner.

When the voltage between the primary side coil 15 and the capacitor 14 forming the series resonance circuit is denoted as V1 (an example of voltage applied to the resonance circuit) and the voltage across the primary side coil 15 is denoted as V2, the Q value of the series resonance circuit is represented by Equation (1).

$$Q = V2/V1 = 2\pi f L rs \quad (1)$$ ##EQU00001## where r.sub.s is the effective resistance value at frequency f.

The voltage V1 is multiplied by Q, and the voltage V2 is obtained. When the metal piece approaches the primary side coil 15, the effective resistance value r.sub.s increases, and the Q value decreases. As described above, when the metal piece approaches the primary side coil 15, the Q value (electromagnetically coupled state) to be measured changes. Consequently, by detecting this change, it is possible to detect the metal piece near the primary side coil 15.

Figure 5:
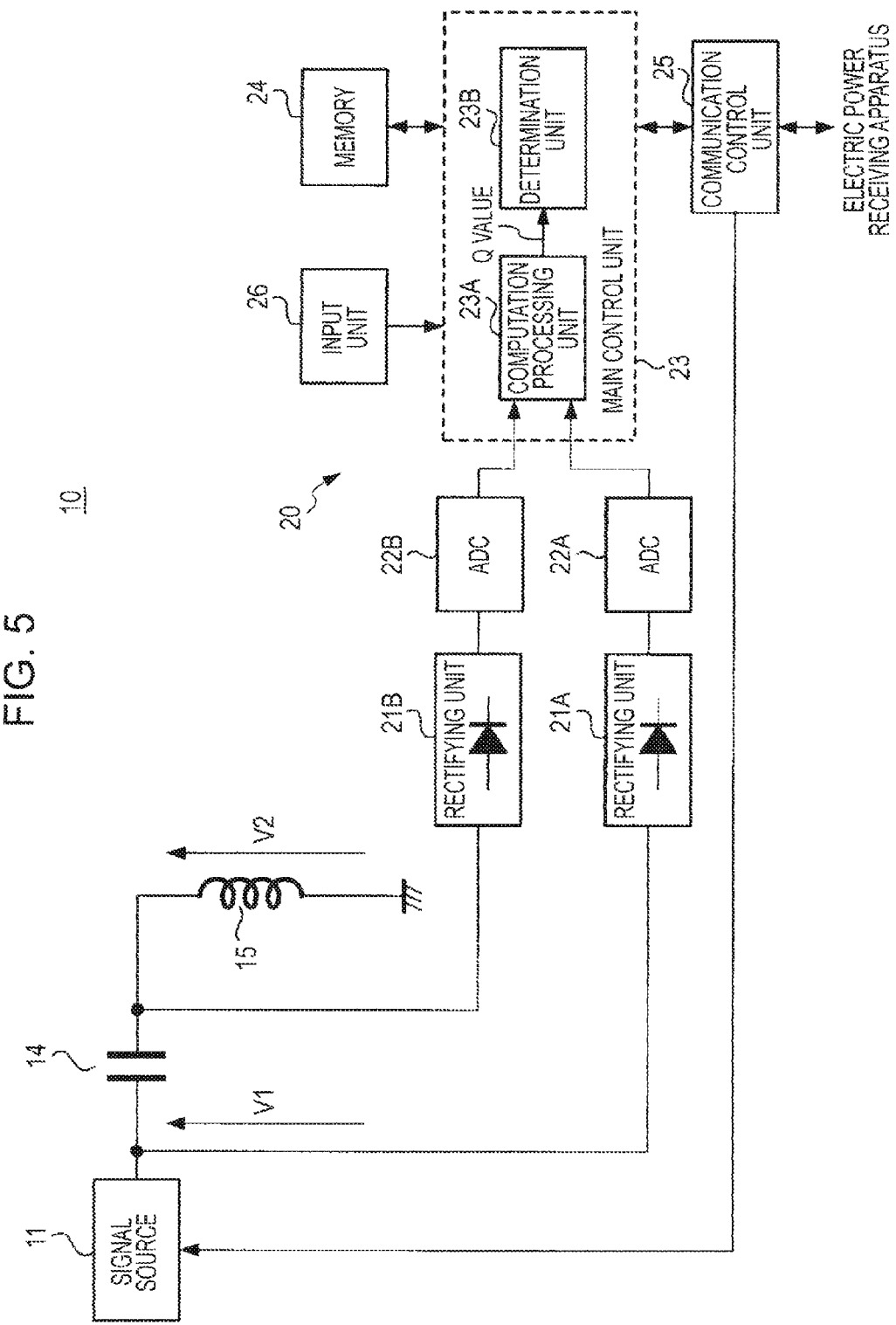
FIG. 5 is a block diagram illustrating an example of the internal configuration of an electric power transmission apparatus (primary side) used for a wireless non-contact electric power transmission system.

Example of Configuration of a Wireless or Non-Contact Electric Power Transmission System Example of Configuration of Electric Power Transmission Apparatus FIG. 5 is a block diagram illustrating an example of the internal configuration of the electric power transmission apparatus (primary side) used for a non-contact electric power transmission system. The block diagram shown in FIG. 5 illustrates a more specific configuration of the electric power transmission apparatus shown in FIG. 4, in which a Q value measurement circuit 20 (an example of a detection unit) shown in FIG. 5 detects metal foreign matter. The electric power transmission apparatus in which the Q value measurement circuit 20 is provided is an example of a detection apparatus.

As an example, elements forming the Q value measurement circuit 20 include rectifying units 21A and 21B, analog-to-digital converters (hereinafter referred to as "ADC") 22A and 22B, and a main control unit 23. Each block forming the electric power transmission apparatus 10 including blocks in the Q value measurement circuit 20 operates on the basis of the electric power supplied from the signal source 11 or a battery (not shown).

The rectifying unit 21A converts an alternating-current signal (AC voltage) input from between the primary side coil 15 and the capacitor 14 into a DC signal (DC voltage), and outputs it. Similarly, the rectifying unit 21B converts an alternating-current signal (AC voltage) input from between the signal source 11 and the capacitor 5 into a DC signal (DC voltage). The converted DC signals are input to the corresponding ADCs 22A and 22B.

The ADCs 22A and 22B convert analog DC signals input from the rectifying units 21A and 21B into digital DC signals, respectively, and output them to the main control unit 23.

The main control unit 23 is an example of the control unit, and controls the whole of the electric power transmission apparatus 10 constituted by, for example, a micro-processing unit (MPU). The main control unit 23 functions as a computation processing unit 23A and a determination unit 23B.

The computation processing unit 23A is a block for performing a predetermined computation process. In this example, the ratio of the voltage V1 to the voltage V2, that is, the Q value, is calculated on the basis of the DC signals that are input from the ADCs 22A and 22B, and the calculation result is output to the determination unit 23B. Furthermore, the computation processing unit 23A can also obtain the information (the physical quantity, such as a voltage value) relating to the detection of metal foreign matter from the electric power receiving side (secondary side) and can calculate the Q value of the secondary side on the basis of the information.

The determination unit 23B compares the calculation result input from the computation processing unit 23A with a threshold value stored in a non-volatile memory 24, and determines whether or not metal foreign matter is present nearby on the basis of the comparison result. Furthermore, the determination unit 23B can compare the Q value on the electric power receiving side with the threshold value so as to determine whether or not metal foreign matter is present nearby.

The memory 24 stores the threshold value (Ref_Q1) of the primary side Q value, which has been measured in advance, in a state in which there was nothing in the vicinity of the secondary side coil or nothing was placed in the secondary side coil. Furthermore, the memory 24 also stores the threshold value (Q_Max) of the secondary side Q value obtained from the electric power receiving side (secondary side).

The communication control unit 25 is an example of the primary side communication unit, and performs communication with the communication control unit of the electric power receiving apparatus (to be described later). For example, the communication control unit 25 performs transmission and reception of information relating to the detection of metal foreign matter, such as receiving the Q value, the voltage V1, the voltage V2 and the like of the resonance circuit including the secondary side coil of the electric power receiving apparatus. Furthermore, the communication control unit 25 instructs the signal source 11 to generate or stop an AC voltage under the control of the main control unit 23. For the communication standard in the communication with the electric power receiving apparatus, for example, a wireless LAN of IEEE 802.11 standard or Bluetooth (registered trademark) can be used. The configuration may be formed in such a way that information is transmitted through the primary side coil 15 and the secondary side coil of the electric power receiving apparatus. Furthermore, an instruction may be directly given from the main control unit 23 to the signal source 11 without using the communication control unit 25.

The input unit 26 generates an input signal corresponding to a user operation and outputs the input signal to the main control unit 23.

In this example, the configuration has been described as having the Q value measurement circuit 20 incorporated in the electric power transmission apparatus 10 and as being capable of detecting metal foreign matter on the basis of the Q value on the primary side and the metal foreign matter on the basis of the Q value on the secondary side. Not limited to this, it is sufficient that the electric power transmission apparatus 10 includes a main control unit 23 that performs at least a computation process and a determination process, and a communication control unit 25, and includes a function of determining the electromagnetically coupled state on the basis of the Q value of the electric power receiving apparatus and detecting metal foreign matter.

As described above, by applying the measurement principles to an electric power receiving apparatus (secondary side), it is possible for the electric power receiving apparatus to measure the Q value. However, while electric power supply is being performed at the time of Q value measurement, the magnetic field output from the electric power transmission side causes large electric power to be generated in the coil of the electric power receiving apparatus, and the voltage V2 is difficult to be measured normally. For this reason, an accurate Q value is difficult to be obtained, and there is a risk that metal foreign matter is difficult to be detected with high accuracy.

In order to solve the inconvenience, it is necessary to stop electric power supply at the time of measurement. However, if electric power supply is stopped, a large battery that operates the circuit for measuring the Q value on the secondary side becomes necessary. If a battery is housed in the electric power receiving apparatus, an adverse influence may occur in the product service lifetime, and a situation may occur in which, for example, metal foreign matter detection is difficult to be performed in a case where the charged capacitance of the battery of the portable device becomes exhausted, and charging is desired to be performed immediately.

Accordingly, the inventors of the present disclosure considered a batteryless electromagnetically coupled state detection technology in which when Q value measurement is to be performed on the secondary side by using electric power supplied from the primary side, first, while the electric power reception is being performed from the primary side, the Q value measurement is not performed on the secondary side.

Example of Configuration of Electric Power Receiving Apparatus

An example of the configuration of a batteryless electric power receiving apparatus (secondary side), which is used for a non-contact electric power transmission system, will be described below.

Figure 6:
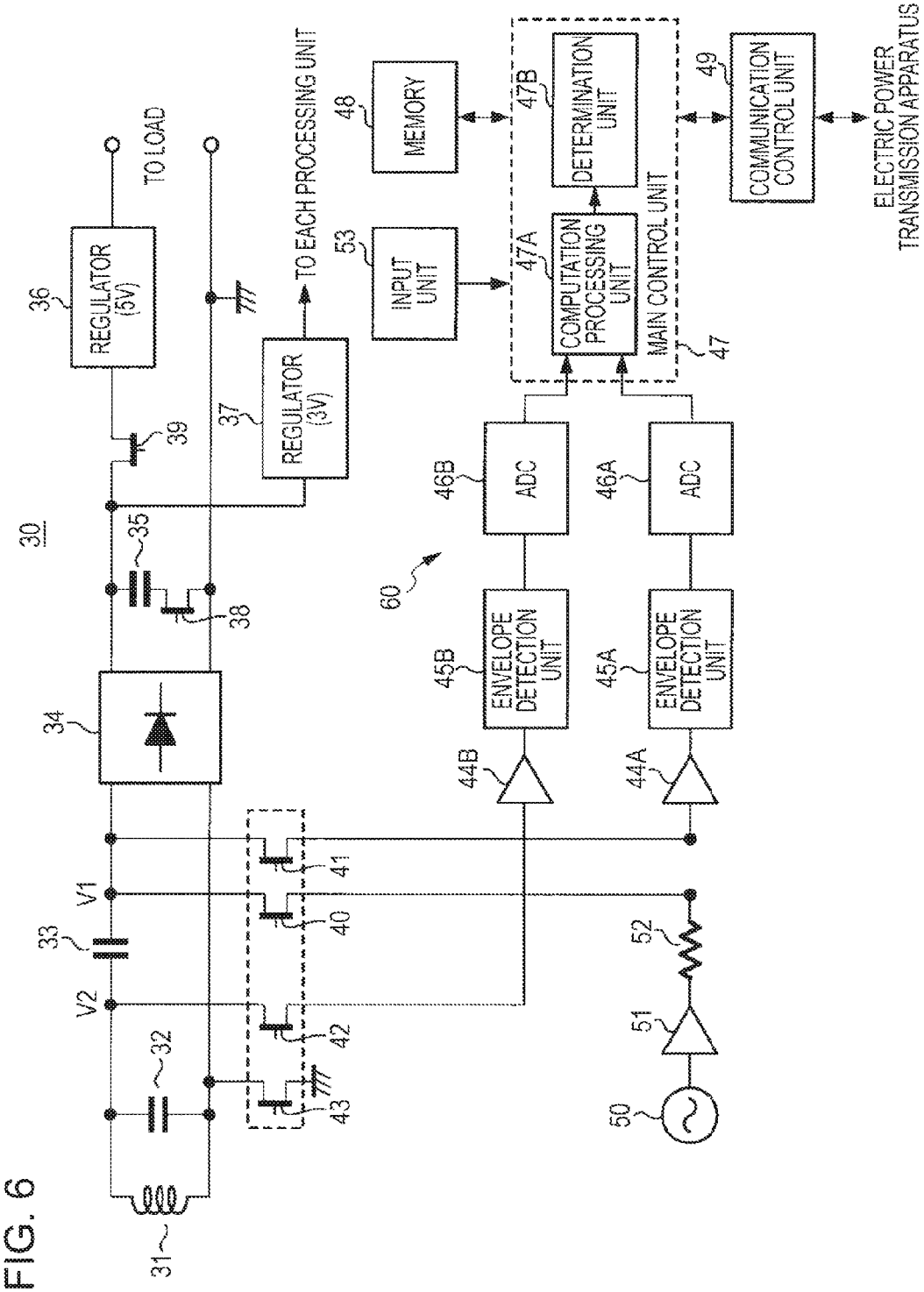
FIG. 6 is a block diagram illustrating an example of the internal configuration of a batteryless electric power receiving apparatus (secondary side) used for a wireless or non-contact electric power transmission system.

FIG. 6 is a block diagram illustrating an example of the internal configuration of an electric power receiving apparatus that is applied to a portable device or the like. The configuration is formed in such a way that a circuit used at the time of electric power supply and at the time of Q value measurement is switched between by switching. At the time of Q value measurement, a Q value measurement circuit 60 (an example of detection unit) detects whether metal foreign matter is present. The electric power receiving apparatus provided with the Q value measurement circuit 60 is an example of the detection apparatus.

The electric power receiving apparatus 30 of the present example includes a secondary side coil 31 and a capacitor 32 that is connected in parallel to the secondary side coil 31. One end of the parallel-connected secondary side coil 31 and one end of the capacitor 32 are connected to one end of the capacitor 33, and the other end of the capacitor 33 is connected to one input end of the rectifying unit 34. The other ends of the secondary side coil 31 and the capacitor 32, which are connected in parallel with each other, are connected to the other input end of the rectifying unit 34. One output end of the rectifying unit 34 is connected to the input end of the first regulator 36 through a second switch 39, the output end of the first regulator 36 is connected to the load, and the other output end of the rectifying unit 34 is connected to the ground terminal. A second regulator 37 is also connected to one output end of the rectifying unit 34. Furthermore, the capacitor 35 and the first switch 38 are connected in series with each other, one end of the capacitor 35 is connected to one output end of the rectifying unit 34, and one end of the first switch 38 is connected to the other output end of the rectifying unit 34.

The first regulator 36 performs control so that the voltage and the electric current to be output are typically maintained constant, and supplies a voltage of 5V to the load, for example. Similarly, the second regulator 37 supplies a voltage of 3V to each block including each switch, for example.

A third switch 40 is connected to the other end of the capacitor 33, and is connected to an AC power supply 50 (oscillation circuit) through the third switch 40, a resistance element 52, and an amplifier 51. Furthermore, the input end of the amplifier 44A is connected to the other end of the capacitor 33 through a third switch 41. Additionally, the input end of the amplifier 44B is connected to one end of the capacitor 33 through a third switch 42. Furthermore, the other ends of the secondary side coil 31 and the capacitor 32, which are connected in parallel with each other, are connected to the ground terminal through the third switch 43.

For the first switch 38 (an example of first switching unit), the second switch 39 (an example of second switching unit), and the third switches 40 to 43 (examples of third switching units), switching elements, such as transistors and MOSFETs, are used. In this example, MOSFETs are used.

As this example, components forming the Q value measurement circuit 60 include amplifiers 44A and 44B, envelope detection units 45A and 45B at a subsequent stage, analog-to-digital converters (hereinafter referred to as "ADC") 46A and 46B, and a main control unit 47 (computation processing unit 47A, determination unit 47B).

The output end of the amplifier 44A is connected to an envelope detection unit 45A. The envelope detection unit 45A detects the envelope of the alternating-current signal (corresponding to the voltage V1), which is input from the other end of the capacitor 33 through the third switch 41 and the amplifier 44A, and supplies the detection signal to the ADC 46A.

Additionally, the output end of the amplifier 44B is connected to an envelope detection unit 45B. The envelope detection unit 45B detects the envelope of the alternating-current signal (corresponding to the voltage V2), which is input from one end of the capacitor 33 through the third switch 42 and the amplifier 44B, and supplies the detection signal to the ADC 46B.

The ADCs 46A and 46B convert analog detection signals input from the envelope detection units 45A and 45B into digital detection signals, respectively, and output them to the main control unit 47.

The main control unit 47 is an example of the control unit, and controls the whole of the electric power receiving apparatus 30 constituted by, for example, a micro-processing unit (MPU). The main control unit 47 functions as a computation processing unit 47A and a determination unit 47B. The main control unit 47 supplies a driving signal to each switch (a gate terminal of a MOSFET) by using electric power supplied from the second regulator 37 so as to control on/off (switch switching function).

The computation processing unit 47A is a block for performing a predetermined computation process, calculates the ratio of the voltage V1 to the voltage V2, that is, Q value, on the basis of the detection signal input from the ADCs 46A and 46B, and outputs the calculation result to the determination unit 47B. Furthermore, the computation processing unit 47A can also transmit the information (voltage value, etc.) on the input detection signal to the electric power transmission side (primary side) in accordance with the setting. Furthermore, at the time of a metal foreign matter detection process, a frequency sweep process is performed (sweep processing function).

The determination unit 47B compares the Q value input from the computation processing unit 47A with the threshold value stored in a non-volatile memory 48, and determines whether or not metal foreign matter is present near on the basis of the comparison result. As will be described later, it is also possible to transmit the measured information to the electric power transmission apparatus 10, so that the electric power transmission apparatus 10 can calculate the secondary side Q value and determine the presence or absence of metal foreign matter.

The memory 48 stores a threshold value to be compared with a Q value, which has been measured in advance, in a state in which there was nothing in the vicinity of the secondary side coil 31 or nothing was placed in the secondary side coil 31.

The communication control unit 49 is an example of the secondary side communication unit, and performs communication with the communication control unit 25 of the electric power transmission apparatus 10. For example, the communication control unit 49 performs transmission and reception of information relating to the detection of the metal foreign matter, such as transmitting the Q value, the voltage V1, the voltage V2, and the like of the resonance circuit including the secondary side coil 31 of the electric power receiving apparatus 30. The communication standard applied to the communication control unit 49 is the same as the communication standard that is applied to the communication control unit 25 of the electric power transmission apparatus 10. The configuration may be formed in such a way that information is transmitted through the secondary side coil 31 and the primary side coil 15 of the electric power transmission apparatus 10.

The AC power supply 50 causes an AC voltage (sine wave) to be generated at the time of Q value measurement on the basis of the control signal of the main control unit 47, and supplies the AC voltage to the other end of the capacitor 33 through the amplifier 51 and the resistance element 52.

The input unit 53 generates an input signal corresponding to a user operation and outputs it to the main control unit 47.

The Q value measurement circuit 60 of the electric power receiving apparatus 30, which is constituted in the manner described above, is controlled by the switching of on/off, a group of three switches, that is, the first switch 38, the second switch 39, and the third switches 40 to 43. Hereinafter, the operation of the electric power receiving apparatus 30 will be described by paying attention to switching of the switches.

First, the electric power received from the electric power transmission apparatus 10 by the secondary side coil 31 is charged in the capacitor 35 (an example of a power storage unit) provided at a subsequent stage of the rectifying unit 34. The electric current value and the time at which the electric power transmission apparatus 10 can operate with the electric power charged in the capacitor is determined by CV=it, where C denotes the electrostatic capacitance of the capacitor, V denotes the voltage value of the capacitor, i denotes the electric current value of the capacitor, and t denotes a time period. That is, when the voltage value charged in a capacitor of 10.mu.F changes from 9V to 4V, the electric current of 50 mA can be made to flow for 1 msec. If the electrostatic capacitance value of the capacitor is large, larger electric current can be made to flow or the time period during which electric current is made to flow can be extended.

However, if the capacitor 35 having a large electrostatic capacitance value is placed at a subsequent stage of the rectifying unit 34, a problem is considered to occur at the time of communication between the electric power receiving apparatus 30 and the external device. Thus, it is preferable that control be performed using the first switch 38. That is, the drain-source of the first switch 38 is made to conduct at only the Q value measurement, and by connecting the capacitor 35, the adverse influence is eliminated.

If the consumption of electric current of the Q value measurement circuit 60 is small to a certain degree and the time period of the Q value measurement is short, it is possible to measure the Q value while the carrier signal from the electric power transmission apparatus 10 is stopped. When the carrier signal to be output from the electric power transmission apparatus 10 is to be stopped (at the time of Q value measurement), it is necessary to reliably electrically disconnect the load from the Q value measurement circuit 60. For example, a P-channel MOSFET is used for the second switch 39, so that control of becoming off when a carrier signal is input to the electric power receiving apparatus 30 may be performed, or control may be performed by using the enable function of the first regulator 36. When the capacitor 35 is being charged or communication is being performed through the communication control unit 49 other than the above, there is no problem even if the load is not disconnected from the Q value measurement circuit 60.

At the time of Q value measurement, similarly to the technique of the above-mentioned measuring instrument (LCR meter), the voltage value across the capacitor 33 is measured. Specifically, the third switches 40 to 43 are turned on at the time at which the carrier signal is stopped, and the Q value is calculated on the basis of two voltage waveforms that are detected at one end and the other end of the capacitor 33 through which the sine wave output from the AC power supply 50 is rectified. By comparing the calculated Q value with the preset threshold value, detection of metal foreign matter is performed.

Deterioration of SN Ratio at Time of Q Value Measurement

The accuracy of the Q value measurement is also greatly affected by the impedance value at the resonance point (resonance frequency) of the resonance circuit. As described in the foregoing, in the configuration of the electric power receiving apparatus 30, the circuits at the time of electric power supply and at the time of Q value measurement are switched between by switching. That is, the voltage across the capacitor 33 is divided by the on-resistance quantity of the third switch 41 and the impedance at the resonance point of the secondary side coil 31, and the amplitude of the voltage decreases. For this reason, the voltage division ratio increases depending on the impedance at the resonance point of the secondary side coil 31, and the SN ratio at the time of Q value measurement may deteriorate.

Figure 7:
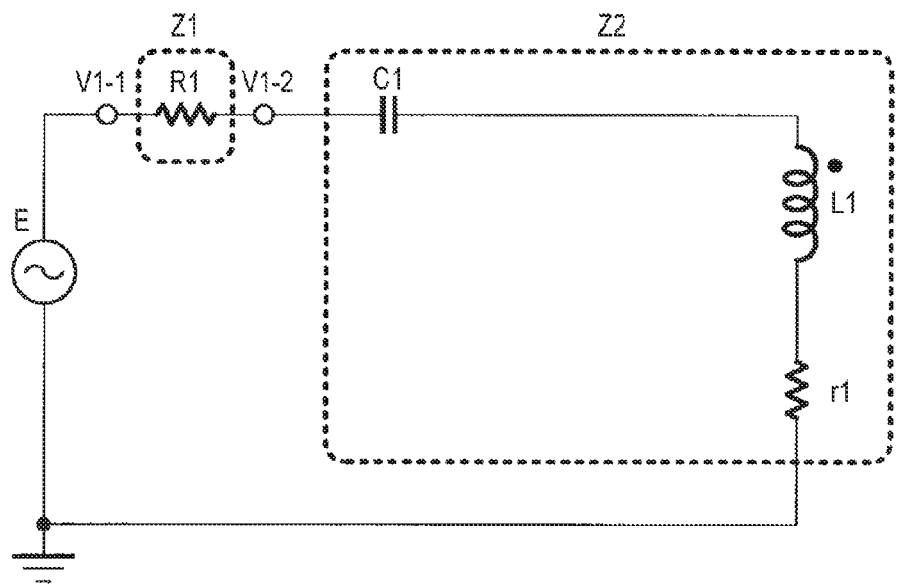
FIG. 7 is an illustration of the concept of voltage division in an equivalent circuit for which a series resonance circuit is assumed.
Figure 8:
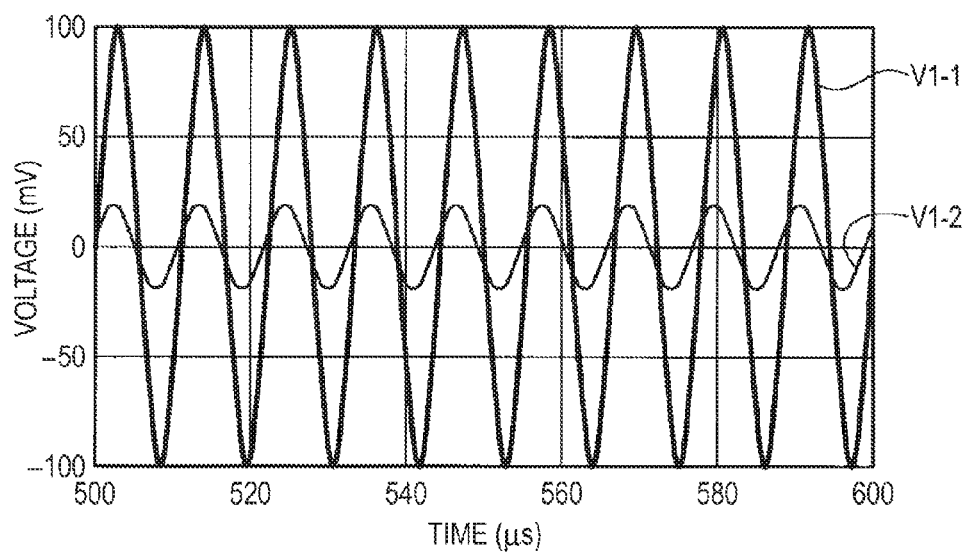
FIG. 8 is a waveform chart illustrating an example of voltage signals that are observed at specified spots of the equivalent circuit shown in FIG. 7.

FIG. 7 illustrates the concept of a voltage division in an equivalent circuit for which a series resonance circuit is assumed. FIG. 8 illustrates trial calculation results of a voltage waveform at each spot of the equivalent circuit of FIG. 7.

In FIG. 7, Z1 indicated by the dashed line represents the on-resistance quantity (on-resistance component R1) of the switching element. Furthermore, Z2 indicated by the dashed line represents a series resonance circuit as an equivalent circuit formed of a coil L1, a capacitor C1, and the effective resistance configuration (effective resistance component r1) at the frequency f of an AC voltage of the AC power supply E.

In the series resonance circuit, since the impedance at the resonance point is formed of only the pure resistance quantity of the coil L1, impedance is voltage-divided at the spot of V1-1 and the spot of V1-2 (corresponding to V1 of FIG. 6), shown in FIG. 7, and the amplitude of the AC voltage decreases.

The results in which the amplitude of the AC voltage were calculated actually at the spot of V1-1 and at the spot of V1-2 by simulation are shown in the waveform chart of FIG. 8. The conditions used for the trial calculation are: the frequency of the AC voltage is 90 kHz, the amplitude is 0.1V, the self-inductance of the coil L1 of the series resonance circuit is 14.3.mu.H, the resistance value of the effective resistance component r1 is 0.6.OMEGA., the electrostatic capacitance value of the capacitor C1 is 227 nF, and the resistance value of the on-resistance component R1 is 3.OMEGA.

In FIG. 8, the waveform of a large amplitude shows the level of the spot V1-1, and the waveform of a small amplitude shows the level at the spot V1-2. It can be certainly seen from this voltage waveform that the amplitude of the AC voltage is decreased.

Next, a description will be given of that the impedance at the resonance point of the resonance circuit differs depending on the configuration of the resonance circuit.

Figure 9A:
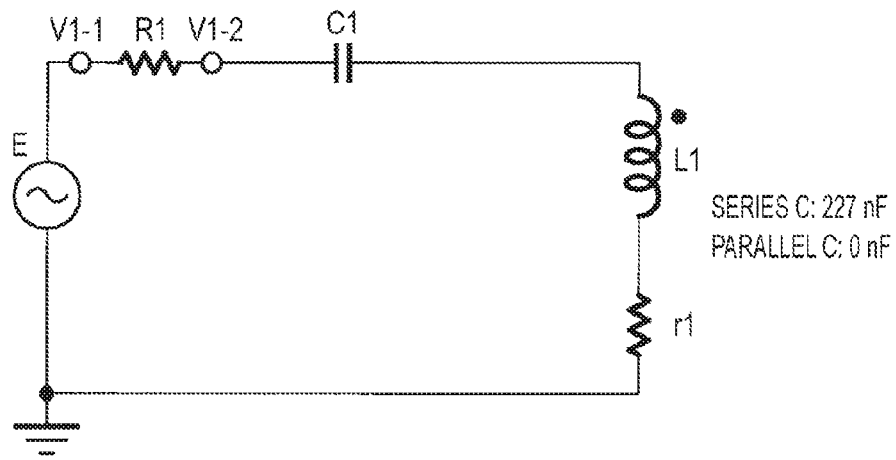
FIGS. 9A, 9B, and 9C are circuit diagrams illustrating the configurations of different resonance circuits.
Figure 9B:
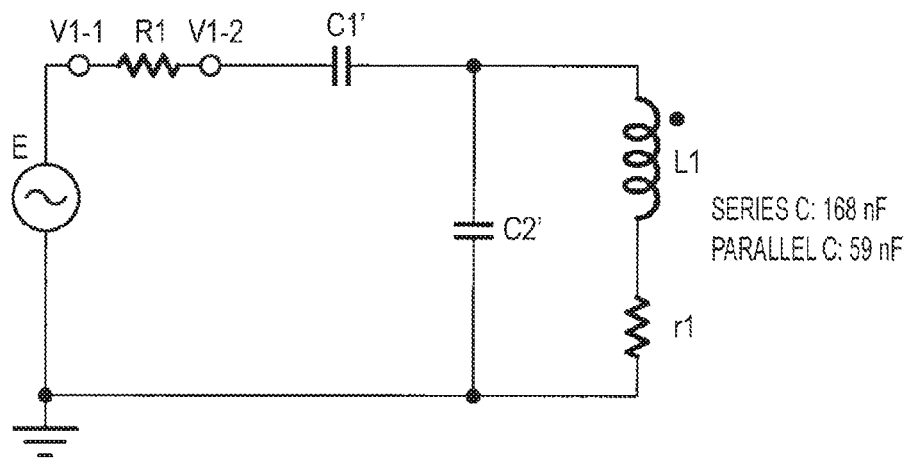
Figure 9C:
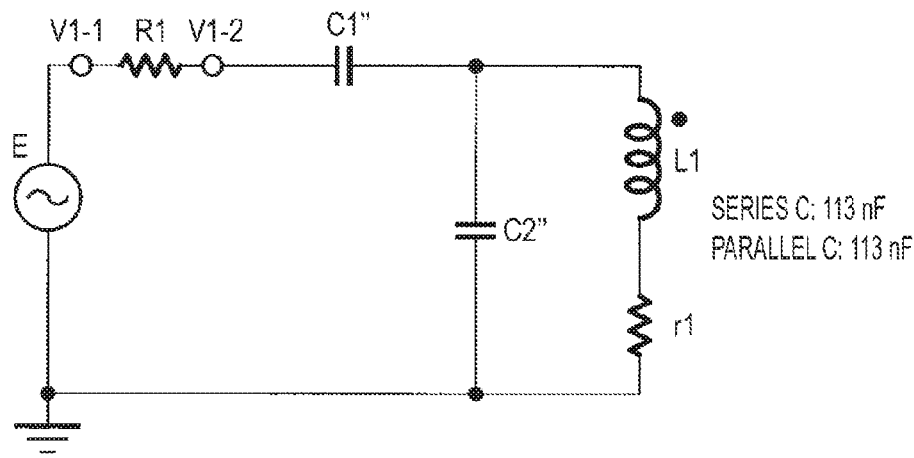

FIGS. 9A, 9B, and 9C are circuit diagrams illustrating the configurations of mutually different resonance circuits.

The resonance circuit of FIG. 9A is a series resonance circuit. In comparison, the resonance circuit of FIG. 9B has a capacitor C1', which is connected in series to the coil L1, and a capacitor C2', which is connected in parallel to the coil L1. The resonance circuit of FIG. 9C has a C1", which is connected in series to the coil L1, and a C2" which is connected in parallel to the coil L1.

In the resonance circuits of FIGS. 9A to 9C, similarly to the case of FIG. 8, the frequency of the AC voltage is 90 kHz, the amplitude thereof is 0.1V, the self-inductance of the coil L1 is 14.3.mu.H, the resistance value of the effective resistance component r1 is 0.6.OMEGA., and the resistance value of the on-resistance component R1 is 3.OMEGA. However, the electrostatic capacitance value of the capacitor C1 of FIG. 9A is 227 nF, the electrostatic capacitance value of the capacitors C1' and C2' of FIG. 9B are 168 nF and 59 nF, respectively, and the electrostatic capacitance values of the capacitors C1" and C2" of FIG. 9C are 113 nF and 113 nF, respectively.

Figure 10:
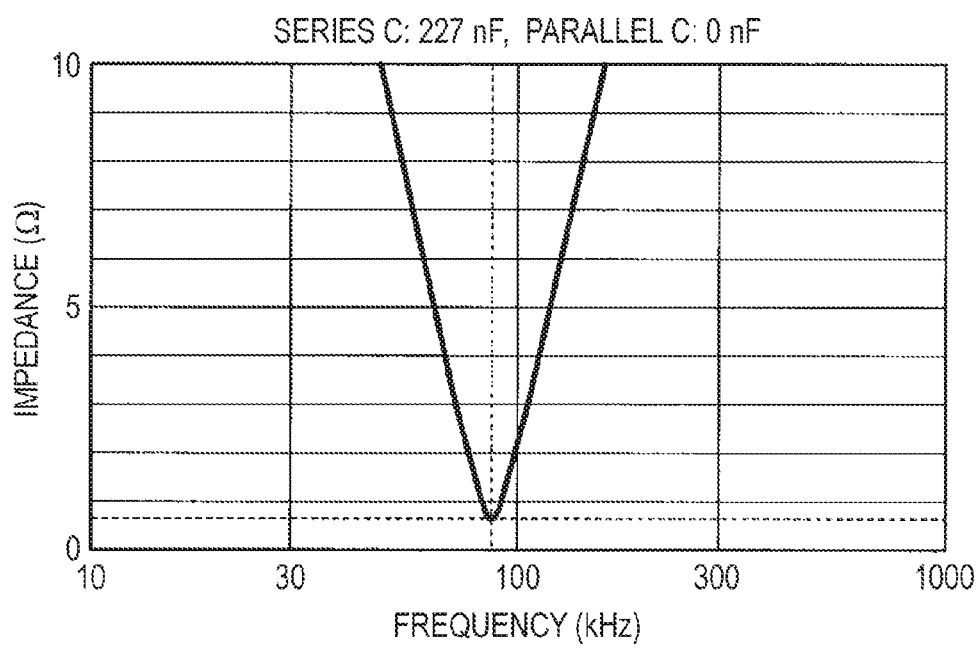
FIG. 10 is a graph illustrating frequency characteristics of the impedance of the resonance circuit shown in FIG. 9A.

FIG. 10 is a graph illustrating frequency characteristics of the impedance of the resonance circuit shown in FIG. 9A.

Figure 11:
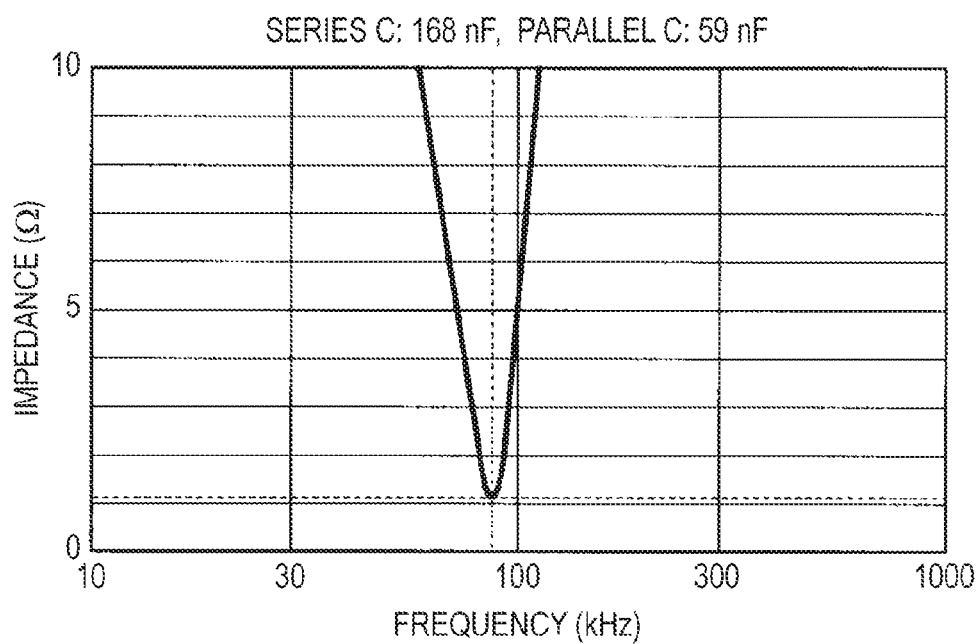
FIG. 11 is a graph illustrating frequency characteristics of the impedance of the resonance circuit shown in FIG. 9B.

FIG. 11 is a graph illustrating frequency characteristics of the impedance of the resonance circuit shown in FIG. 9B.

Figure 12:
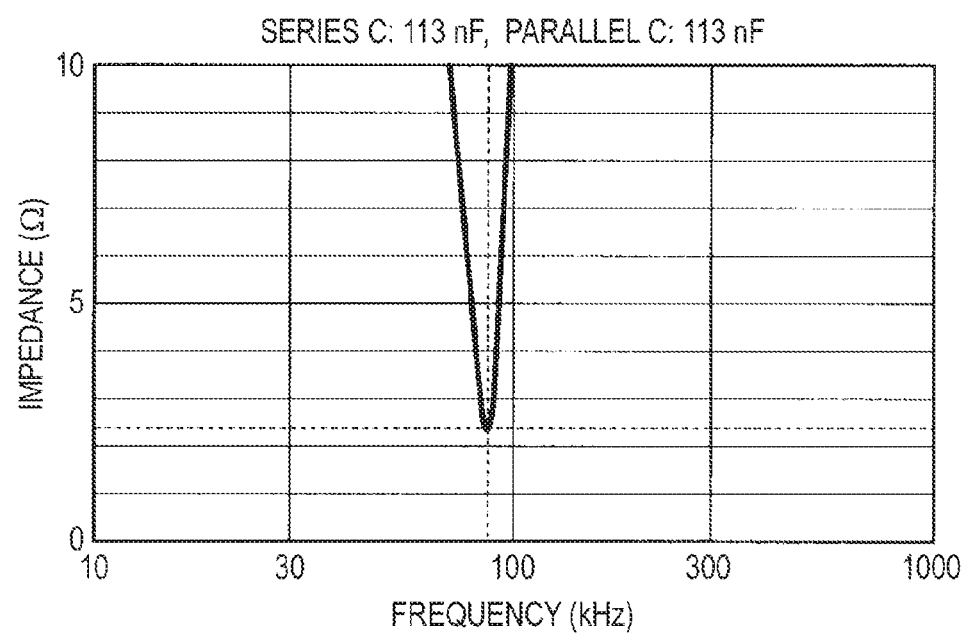
FIG. 12 is a graph illustrating frequency characteristics of the impedance of the resonance circuit shown in FIG. 9C.

FIG. 12 is a graph illustrating frequency characteristics of the impedance of the resonance circuit shown in FIG. 9C.

It can be seen from FIGS. 10 to 12 that the impedance value of the resonance circuit differs even if the resonance frequency (90 kHz in this example) is the same depending on the constant of the resonance circuit. In FIG. 10, the impedance value is about 0.6.OMEGA.; in FIG. 11, the impedance value is about 1.1.OMEGA.; and in FIG. 12, the impedance value is about 2.4.OMEGA. The greater the electrostatic capacitance value of the capacitor that is connected in parallel to the coil L1, the greater the impedance value at the resonance point.

Figure 13:
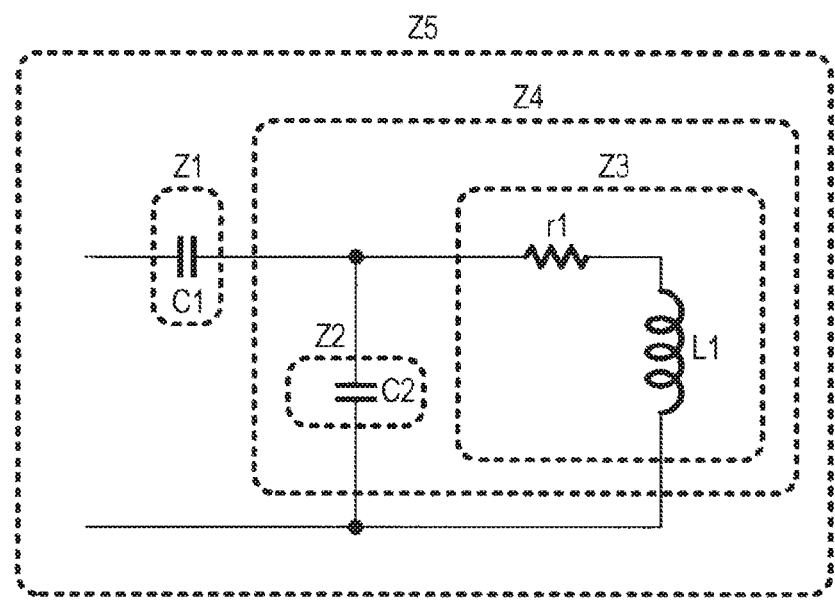
FIG. 13 depicts a method of calculating the impedance value of a resonance circuit by using a transfer function.

FIG. 13 is a circuit diagram illustrating a method of calculating the impedance value of the resonance circuit by using a transfer function by a computer. The circuit example shown in FIG. 13 has the same circuit configuration as the equivalent circuit of the resonance circuit shown in FIGS. 9A and 9B.

Referring to FIG. 13, the impedances of Z1 to Z3 indicated using the dashed lines are:

$$Z1 = 1j.omega.C1(2) Z2 = 1j.omega.C2(3)$$
$$Z3 = j.omega.L + R(4) \quad \text{\#\#EQU00002\#\#}$$

Here, since Z4 is $$Z4 = 11Z2 + 1Z3(5) Z4 = 11j.omega.L + R + j.omega.C2(6) \quad \text{\#\#EQU00003\#\#}$$

Therefore, since the whole impedance, Z5, is Z5=Z1+Z4, $$Z5 = 1j.omega.C1 + 11j.omega.L + R + j.omega.C2,(7) \quad \text{\#\#EQU00004\#\#}$$

and when this is simplified, the following is obtained.

$$Z5 = -(C1+C2)jL.omega.2 + (C1+C2)R.omega. - jLC1C2.omega.3 - jRC1C2.omega.2 - C1.omega. \quad (8) \quad \text{\#\#EQU00005\#\#}$$

By obtaining the impedance of the point (resonance point) at which the imaginary part becomes 0 in accordance with Equation (8), the simulation result of the resonance circuit of FIG. 13 can be obtained.

However, at the time of electric power supply, when the electrostatic capacitance value of the capacitor that is connected in parallel to the coil of the resonance circuit increases, the impedance value on the secondary side at the time of electric power supply becomes high, presenting a problem in that the voltage applied across the secondary side load increases.

Figure 14:
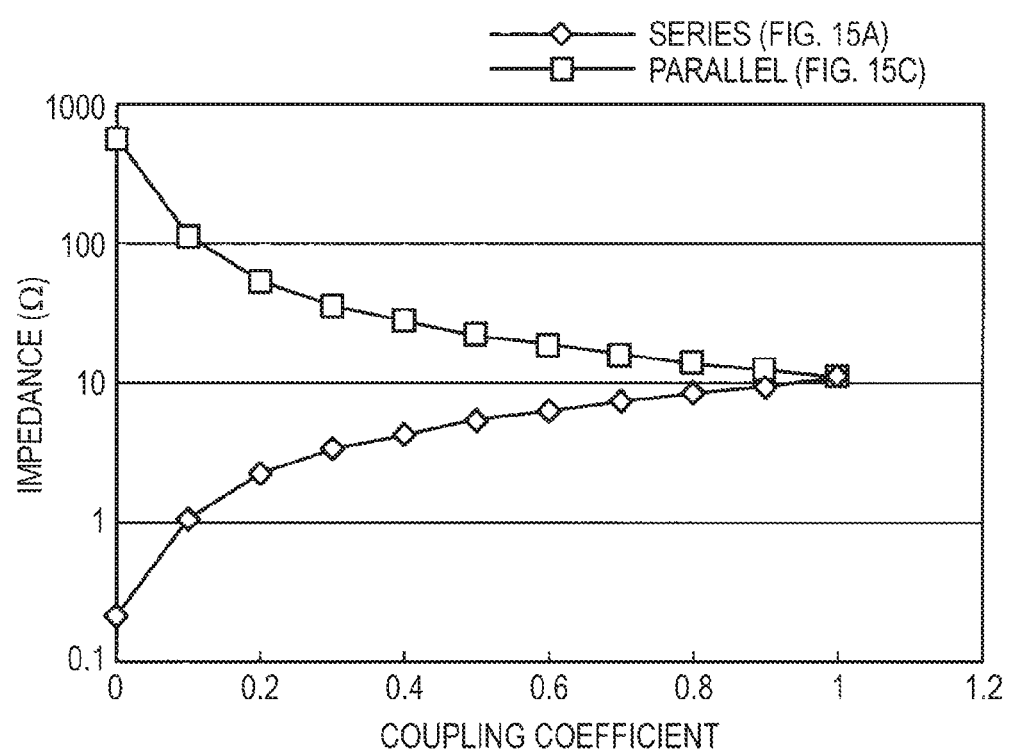
FIG. 14 is an example of a graph illustrating the relationship between a coupling coefficient and impedance.

The optimal impedance value for the efficiency between the primary side coil and the secondary side coil at the time of electric power supply is determined by the self-inductance, the Q value, and the coupling coefficient of the coil. As an example, FIG. 14 illustrates the relationship between a coupling coefficient and impedance.

When the foregoing is considered, if the coil size, the inter-coil distance between the primary side and the secondary side is determined to a certain degree, and furthermore if the target impedance value of the secondary side is determined, the connection form of the capacitor, that is, the configuration and the constant of the resonance circuit, are automatically determined.

Figure 15A:
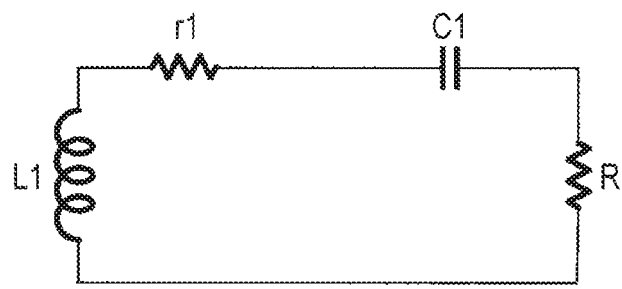
FIGS. 15A, 15B, and 15C are circuit diagrams of connection examples of capacitors for the coils of the resonance circuits.
Figure 15B:
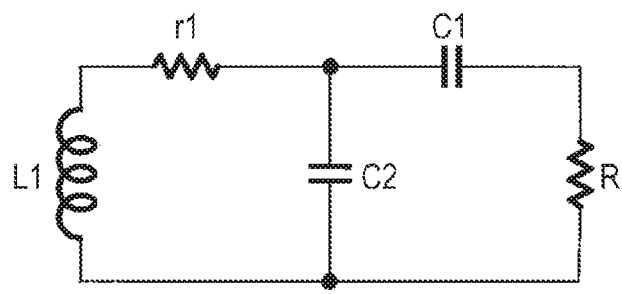
Figure 15C:
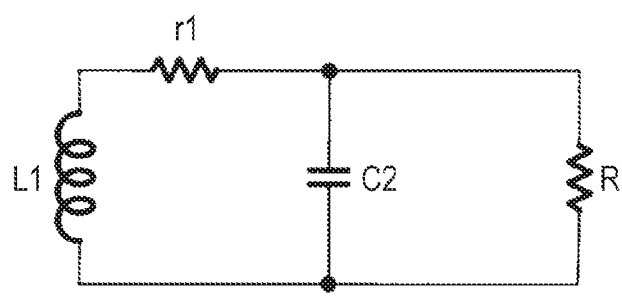

FIGS. 15A, 15B, and 15C are circuit diagrams illustrating examples of connection forms of capacitors with respect to the coils of resonance circuits.

There are three types of connection forms of capacitors with respect to the coil of the resonance circuit:
(1) Series connection to coil (FIG. 15A), (2) Series connection after parallel connection to coil (FIG. 15B), and (3) Parallel connection to coil (FIG. 15C), and any circuit configuration can be taken depending on the case.

The impedance at the resonance point at the time of Q value detection has the same value as that when the coupling coefficient of the graph shown in FIG. 12 is 0. At the time of the above (1), the impedance is a minimum value; at the time of the above (3), the impedance is a maximum value; and at the time of the above (2), the impedance is a value intermediate between them.

Therefore, there is a problem in that the optimum configuration of the resonance circuit at the time of electric power supply and the optimum configuration of the resonance circuit at the time of Q value measurement do not necessarily match each other.

Example of Configuration of First Embodiment
Example of Configuration of Capacitor and Switch Accordingly, a technique of switching the configuration (constant) of the resonance circuit at the time of electric power supply and at the time of foreign matter detection by Q value measurement is proposed.

Figure 16:
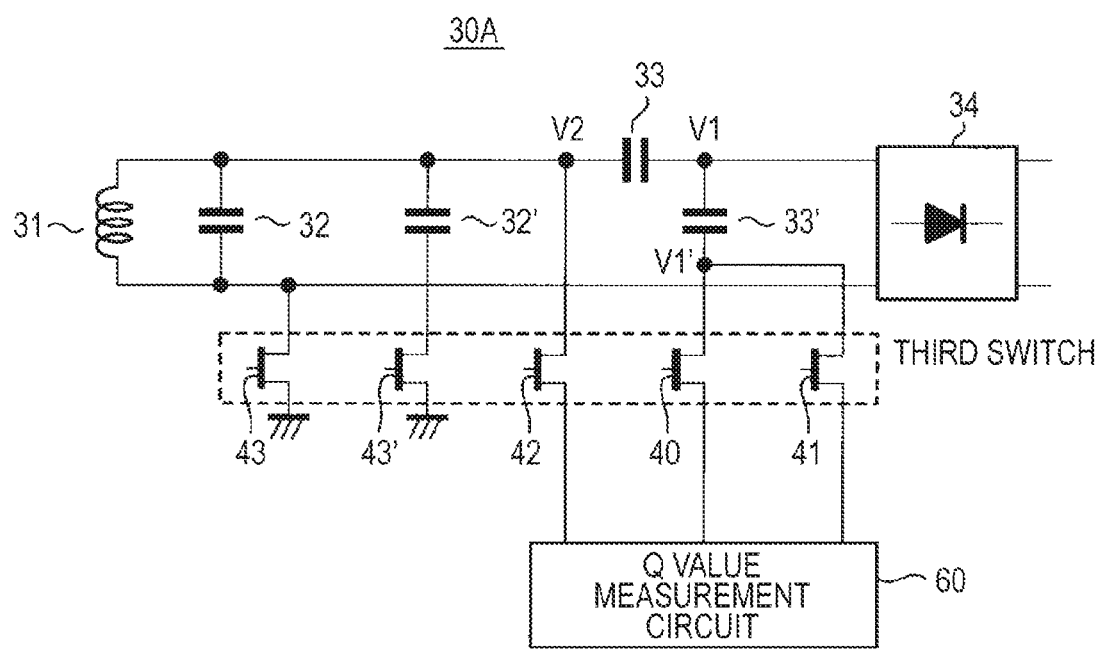
FIG. 16 is a block diagram illustrating the main portion of an example of the internal configuration of an electric power receiving apparatus (secondary side) according to a first exemplary embodiment of the present disclosure.

FIG. 16 is a block diagram illustrating the main portion of an example of the internal configuration of an electric power receiving apparatus (secondary side) that performs the switching of the configuration (constant) of the resonance circuit at the time of electric power supply and at the time of Q value measurement according to the first exemplary embodiment of the present disclosure.

The difference of the electric power receiving apparatus 30A according to the present embodiment from the electric power receiving apparatus 30 shown in FIG. 6 is that a capacitor 32' and a capacitor 33' are added to the resonance circuit, a third switch 43' is added thereto, and the remainder is the same as that of FIG. 6. FIG. 6 can therefore be referenced, as applicable, with respect to these similarities. The third switches 40 to 43, and 43' are in a state of off at the time of electric power supply, and are seen as being open and thus, there is no concern that an adverse influence being exerted at the time of electric power supply.

The capacitor 32' is connected in parallel with the capacitor 32. The capacitor 33' is connected in series with the capacitor 33 when the third switches 40 and 41 are turned on. The third switch 43' for which a transistor, an MOSFET, or the like is applied is connected between the capacitor 32' and the ground terminal. The third switches 41 and 43' are examples of circuit switching units.

The switches of the third switches are simultaneously turned on at the time of Q value measurement. The capacitor 32' is in parallel to the capacitor 32, increases the electrostatic capacitance value parallel to the secondary side coil 31 by turning on the third switch 43 at the time of Q value measurement, and increase the impedance at the resonance point of the resonance circuit. By increasing the impedance at the resonance point as described above, it becomes possible to maintain the amplitude level of the AC voltage that is detected at the time of Q value measurement to be high, leading to the improved SN ratio.

It does not matter that the capacitor 32 may be present or may not be present (may be a series resonance circuit at the time of electric power supply).

Furthermore, the capacitor 33' is connected in series with the capacitor 33, and decreases the electrostatic capacitance value in series with the secondary side coil 31 at the time of electric power supply. By decreasing the electrostatic capacitance value in series with the secondary side coil 31 at the time of Q value measurement, it is possible to increase the frequency at the resonance point.

As a result, it is possible to restore the resonance frequency that has become low as a result of increasing the electrostatic capacitance value parallel to the secondary side coil 31 at the time of Q value measurement. In addition, as described above, in the case of a frequency having a low Q value at the frequency at the time of electric power supply, it is possible to increase the frequency at the time of Q value measurement.

For the Q value measurement circuit of the electric power receiving apparatus 30A, the configuration of the Q value measurement circuit 60 shown in FIG. 6 can be used. The Q value measurement circuit 60 measures the voltage (voltage V1') at both ends of capacitors 33 and 33', which are connected in series with each other, that is, the voltage (voltage V1') at the spot or node of V1' of the resonance circuit and the voltage (voltage V2) at the spot or node of V2.

As described above, by appropriately switching between the third switches 40 to 43, and 43', it is possible to prevent the measurement signal (sine wave signal) that is output by the AC power supply of the secondary side used for the Q value measurement from interfering with the electric power supply signal supplied from the primary side, and it is possible to calculate a highly accurate Q value.

Moreover, by making the configuration of the resonance circuit at the time of electric power supply and the configuration of the resonance circuit at the time of metal foreign matter detection by the Q value measurement to be optimal configurations (constant: electrostatic capacitance value), it is possible to improve the detection accuracy of metal foreign matter without deteriorating electric power supply performance.

Furthermore, even when electric power supply is not performed from the electric power transmission side to the electric power receiving side, the detection of metal foreign matter that exists between the electric power transmission side and the electric power receiving side is performed, and the configuration of the resonance circuit is switched at the time of metal foreign matter detection by the Q value measurement, thereby improving the detection accuracy. Therefore, a frequency that is different from that at the time of electric power supply is selected at the time of metal foreign matter detection by the Q value measurement, and is supplied to the resonance circuit, so that it is possible to detect metal foreign matter by the Q value measurement without depending on the diameter of the coil, and the wireless electric power supply method (magnitude of coupling coefficient), such as an electromagnetic induction method and a magnetic-field resonance method.

In the example of FIG. 16, a case has been described in which when shifting from the electric power supply to the Q value measurement, the circuit configuration of the resonance circuit is switched, and the resonance frequency is increased. As can be understood from FIGS. 1 to 3, in a case where the resonance frequency is high, it may be lowered to a frequency at which the Q value becomes a maximum, and the Q value measurement may be performed.

Furthermore, in the example of FIG. 16, a case has been described in which when shifting from the electric power supply to the Q value measurement, the value of the capacitance (electrostatic capacitance components) that is in parallel with or in series with the coil of the resonance circuit is changed. However, only the capacitance in parallel with the coil may be changed (increase for example) or only the capacitance in series with the coil may be changed (decrease for example). In order to change the capacitance, the capacitor may be switched to another capacitor so as to change the capacitance.

In the present embodiment, the connection form of the capacitor for the coil of the resonance circuit can be applied to any of the following:
(1) Series connection to coil (2) Series connection to coil after parallel connection (3) Parallel connection to coil In a case where the capacitor of the resonance circuit not at the time of Q value measurement is only at the parallel connection to the coil of the above (3), when, for example, there is no capacitor 33 with respect to the secondary side coil 31 of FIG. 16, and only the parallel capacitor 32 is connected, only the capacitor 33' is connected in series with the parallel connection of the secondary side coil 31 and the capacitor of the resonance circuit when the third switch is turned on.

Entire Control of a Wireless Electric Power Transmission System

Here, a description will be given of the entire control process of the non-contact electric power transmission system according to the first embodiment of the disclosure.

Figure 17:
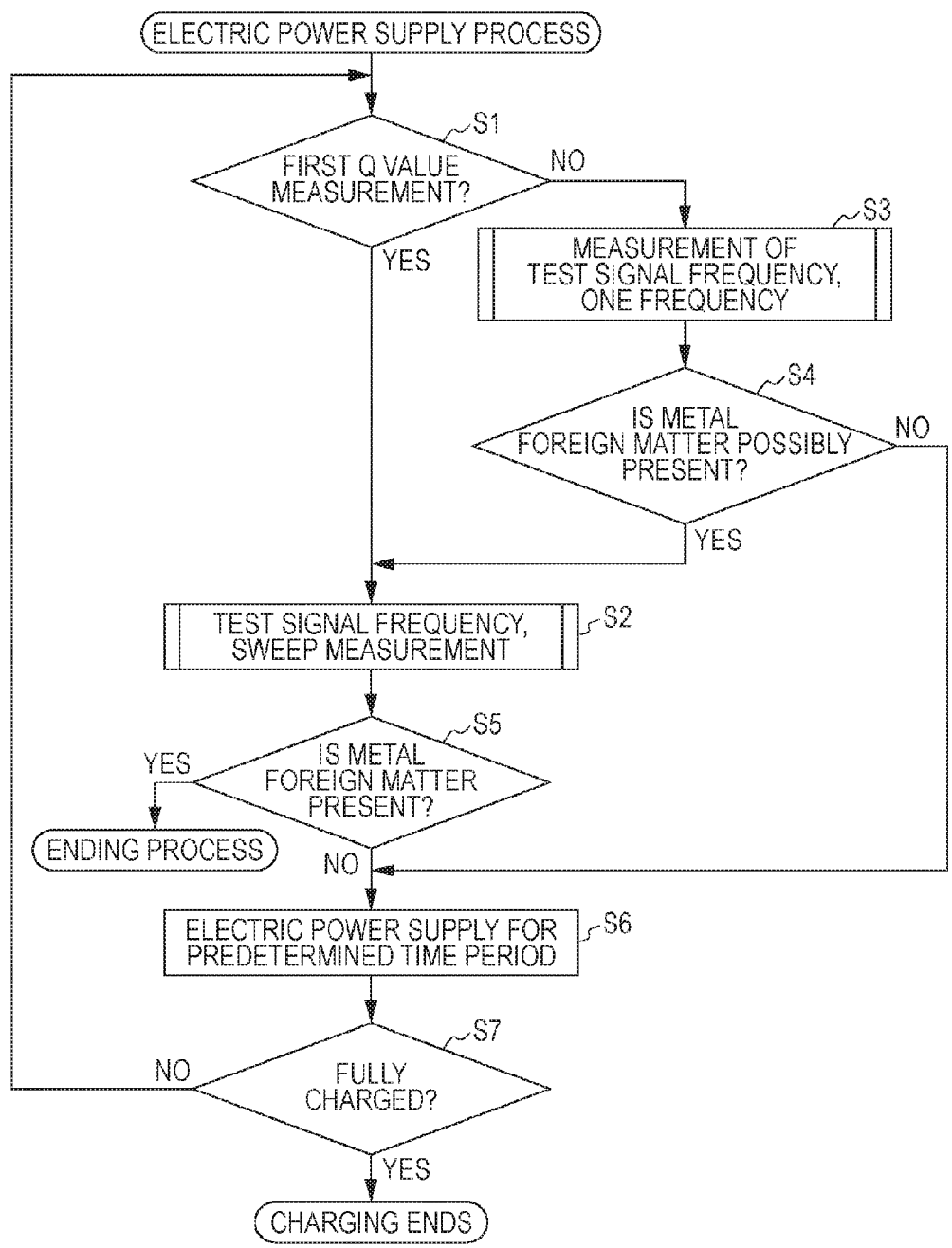
FIG. 17 is a flowchart illustrating processing at the time of electric power supply of a wireless or non-contact electric power transmission system according to a first exemplary embodiment of the disclosure.

FIG. 17 is a flowchart illustrating processing at the time of electric power supply of a non-contact electric power transmission system, which is constituted by including the electric power transmission apparatus 10 (see FIG. 5) and the electric power receiving apparatus 30A (see FIG. 16).

First, when the electric power transmission apparatus 10 (primary side) is started, and the electric power receiving apparatus 30A (secondary side) is placed near the electric power transmission apparatus 10, negotiation is performed between the electric power transmission apparatus 10 and the electric power receiving apparatus 30A. After the electric power transmission apparatus 10 and the electric power receiving apparatus 30A recognize each other, electric power supply starts. The electric power transmission apparatus 10 or the electric power receiving apparatus 30A performs Q value measurement when starting electric power supply. Whether or not the count of the Q value measurements is one is determined (step S1).

As an example, in the case of immediately after the power supply of the electric power transmission apparatus 10 or the electric power receiving apparatus 30A is switched on, each device determines that this is a first Q value measurement. Alternatively, as a result of the negotiation, when the electric power transmission apparatus 10 recognizes that the electric power receiving apparatus 30A is a first communication party on the basis of the ID (identification) information of the electric power receiving apparatus 30A, the electric power transmission apparatus 10 determines that this is a first Q value measurement. Alternatively, at the time of negotiation, the electric power transmission apparatus 10 may receive the result of the Q value measurement count calculated by the electric power receiving apparatus 30A from the electric power receiving apparatus 30A, and know the count of the Q value measurements.

As another example, the Q value measurement count calculated may be determined on the basis of the elapsed time period from the previous Q value measurement. The electric power transmission apparatus 10 (and the electric power receiving apparatus 30A) includes a clock unit (not shown). When Q value measurement is performed, the electric power transmission apparatus 10 (and the electric power receiving apparatus 30A) stores the measured Q value in the memory 24 (and the memory 48) in such a manner as to be associated with the previous measurement time. Then, by comparing the Q value measurement time with the current Q value measurement time, the electric power transmission apparatus 10 (and the electric power receiving apparatus 30A) determines that this is a first Q value measurement if there is a time difference exceeding a certain value. Q value measurement involving, for example, frequency sweep is defined a first time measurement, and the count is calculated on the basis of this. The timer function of the clock unit may be started at the time of the previous Q value measurement, and the Q value measurement may be determined on the basis of the elapsed time period of the timer.

Then, in the case of the first Q value measurement, the electric power receiving apparatus 30A uses a plurality of frequencies (sweep measurement) for a test signal (sine wave) to be measured, which is output by the AC power supply 50, and obtains the highest Q value among the plurality of secondary side Q values obtained (step S2). The electric power receiving apparatus 30A stores the frequency of the test signal when the Q value is maximum in the memory 48. The details of the process of step S2 will be described later.

In order to measure the Q value, it may be necessary to input the sine wave of the resonance frequency to the electric power receiving apparatus 30A. However, the resonance frequency changes depending on variations in the quality of parts of the electric power receiving apparatus 30A, variations in the positional relationship between the coil at the time of mounting and the metal (for example, the housing) inside the apparatus, the environment in the surroundings of the secondary side coil 31, the mixture of metal foreign matter, and the like. For this reason, by considering the shift of the resonance frequency and by performing measurement (frequency sweep) by using a plurality of different frequencies at an appropriate range (measurement range) to a certain degree, it is necessary to search for the resonance frequency.

Regarding this frequency sweep, when the entire non-contact electric power transmission system is considered, the frequency sweep is typically necessary at the first Q value measurement, but can be omitted in the second and subsequent times. An example in which frequency sweep can be omitted in the second and subsequent Q value measurements includes a case in which the positional relationship between the electric power transmission apparatus 10 and the electric power receiving apparatus 30A is not greatly changed from that at the first Q value measurement time.

On the other hand, in a case where the Q value measurement is not a first Q value measurement in the determination process of step S1, the electric power receiving apparatus 30A obtains the Q value by using a test signal of a frequency obtained at the first Q value measurement (step S3). The details of the process of step S3 will be described later.

The electric power transmission apparatus 10 or the electric power receiving apparatus 30A determines whether or not metal foreign matter is present on the basis of the secondary side Q value (step S4). When there is no probability that the metal foreign matter is present, the process proceeds to step S6.

On the other hand, when there is a probability that the metal foreign matter is present in the determination process of step S4, the process proceeds to step S2, where the electric power receiving apparatus 30A performs the frequency sweep of a test signal, and obtains the highest Q value among the plurality of secondary side Q values.

After the process of step S2 is completed, the electric power transmission apparatus 10 or the electric power receiving apparatus 30A makes a determination as to the presence or absence of metal foreign matter on the basis of the secondary side Q value obtained by the calculation (step S5). When metal foreign matter is present, since the processing is completed, the electric power supply is forcedly completed, and a warning for the user is given. Examples of electric power supply forced ending process include a method in which the electric power transmission apparatus 10 stops electric power transmission and a method in which even if the electric power transmission apparatus 10 performs electric power transmission, the electric power receiving apparatus 30A stops electric power reception.

The above-mentioned Q value measurements in steps S2 to S5 are used by using the electric power charged into the power storage unit (capacitor 35). For example, in the case of frequency sweep, after the capacitor 35 has been charged with enough electric charge to measure the Q value (that is, voltage V1', V2) for the test signal of one frequency, the following is repeated: Q value measurement is performed, charging is performed once more, and the Q value is measured for the test signal of the next frequency.

Then, when there is no metal foreign matter in step S5, electric power supply is performed for a predetermined time period from the electric power transmission apparatus 10 to the electric power receiving apparatus 30A (step S6).

Finally, the electric power receiving apparatus 30A determines whether or not the battery (load) (not shown) or the like is fully charged, and communicates the result to the electric power transmission apparatus 10 (step S7). When the battery (load) is fully charged, the charging process is completed, and when the battery (load) is not fully charged, the process shifts to step S1, and the above-described processing is repeated. The determination as to whether or not the battery (load) is fully charged, and the communication may be performed during electric power supply.

As described above, frequency sweep may be performed at only the first Q value measurement, and at second and subsequent times, the Q value measurement may be performed by using only the test signal of the frequency, which is assumed to be optimum at the first time. However, when a determination is made such that there is a probability that metal foreign matter is present at second and subsequent times, there is a probability of frequency offset due to that the positional relationship between the primary side coil and the secondary side coil has changed. Thus, the frequency is swept once more so as to make a determination. In the case where it is determined that there is metal foreign matter even if the frequency is swept, the electric power supply is forcedly completed and a warning for the user is given. This technique makes it possible to considerably decrease the time period of the Q value measurement.

Example in which Q Value Calculation Involving Frequency Sweep is Performed on Primary Side Next, a description will be given of a case in which a Q value calculation involving frequency sweep at step S2 is performed on the primary side.

Since frequency sweep is performed, it is presupposed that the Q value calculation is determined to be a first Q value measurement. For the present process, a case is considered in which the electric power transmission apparatus 10 has determined that the Q value calculation is a first Q value measurement, or a case is considered in which the electric power receiving apparatus 30A has determined that the Q value calculation is a first Q value measurement and has transmitted the result thereof to the electric power transmission apparatus 10.

Figure 18:
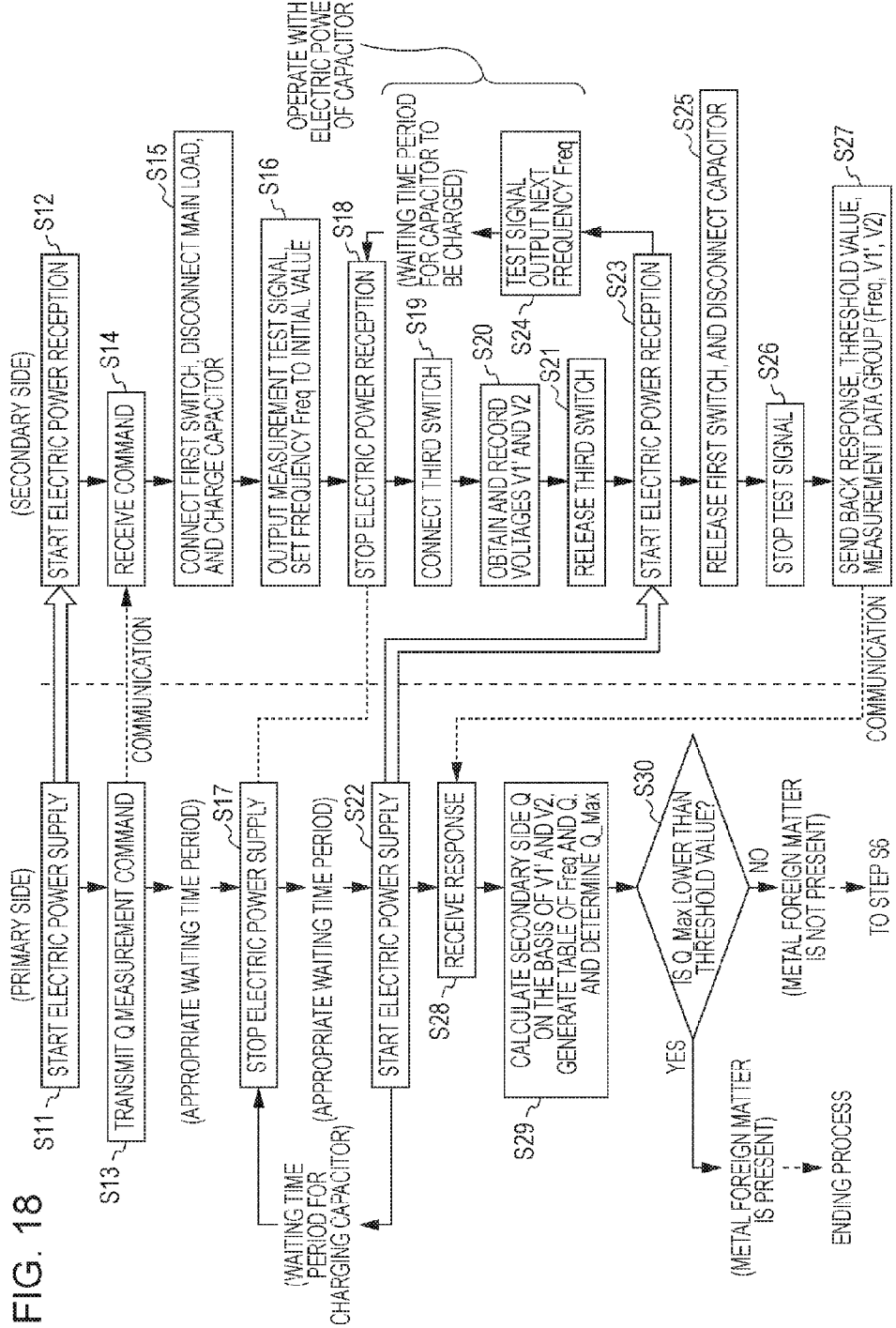
FIG. 18 is a flowchart illustrating processing in a case where a Q value calculation is to be performed, in which frequency sweep is reflected, in the primary side (electric power transmission apparatus)

FIG. 18 is a flowchart illustrating processing in a case where a Q value calculation is to be performed, in which frequency sweep is reflected, on the primary side (electric power transmission apparatus 10).

First, after the negotiation with the main control unit 47 of the electric power receiving apparatus 30A is completed, the main control unit 23 of the electric power transmission apparatus 10 causes an electromagnetic wave to be output from the primary side coil 15 so as to start the electric power transmission process (transmission of a carrier signal) to the electric power receiving apparatus 30A (step S11). The main control unit 47 of the electric power receiving apparatus 30A receives the electromagnetic wave output by the electric power transmission apparatus 10 from the secondary side coil 31, and starts an electric power receiving process (step S12).

When an electric power transmission process starts, the main control unit 23 of the electric power transmission apparatus 10 transmits a first Q value measurement command to the electric power receiving apparatus 30A through the communication control unit 25 (step S13). The main control unit 47 of the electric power receiving apparatus 30A receives the first Q value measurement command from the electric power transmission apparatus 10 through the communication control unit 49 (step S14).

Figure 19:
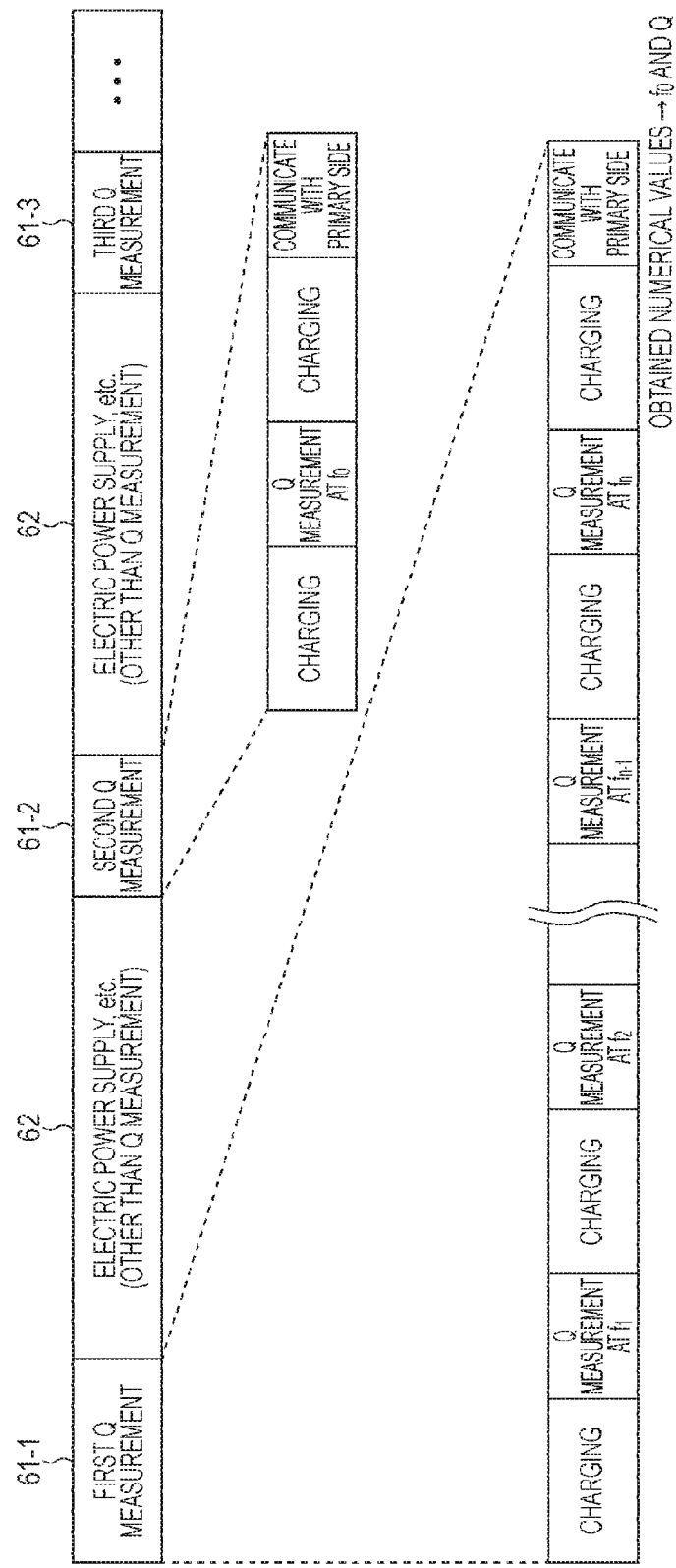
FIG. 19 is an operation timing chart of a wireless or non-contact electric power transmission system according to the first exemplary embodiment of the disclosure.

FIG. 19 is an operation timing chart in the non-contact electric power transmission system according to the first exemplary embodiment of the present disclosure.

In the present embodiment, a "Q value measurement period (61-1, 61-2, 61-3)" during which a Q value measurement process is performed, and an "electric power supply period (62)" during which a process, such as electric power supply (other than Q value measurement), are alternately set. When the communication between the electric power transmission apparatus 10 and the electric power receiving apparatus 30A is established, the main control unit 23 of the electric power transmission apparatus 10 issues a first Q value measurement command in step S13 above. As an example, the first Q value measurement command is transmitted at the start of the first Q value measurement period 61-1. The first Q value measurement period has been divided into a plurality of periods of "charging", "Q value measurement at frequency $f_1$", "charging", "Q value measurement at frequency $f_2$", . . . , "Q value measurement at frequency $f_{n-1}$", "charging", "Q value measurement at frequency $f_n$", "charging", and "communication to primary side".

The main control unit 47 of the electric power receiving apparatus 30A switches on/off of the first switch 38, the second switch 39, and the third switches 40 to 43, and 43' in such a manner as to correspond to the plurality of periods. The following are main switching timings of the first switch 38, the second switch 39, and the third switches 40 to 43, and 43'.

1) First switch 38 is turned on in Q value measurement period (capacitor 35 is charged) and is turned off in other than that period (electric power supply period)

2) Second switch 39 is turned off in Q value measurement period and is turned on in other than that period (electric power supply period)

3) Third switches 40 to 43 and 43' are turned on in the Q value measurement period (in particular, at the time of voltage V1', V2 detection), and are turned off in other than that period When the main control unit 47 of the electric power receiving apparatus 30A receives the first Q value measurement command, the main control unit 47 turns on the first switch 38 so as to electrically connect the rectifying unit 34 and the capacitor 35, and charges the electric power received from the primary side. At this time, the second switch 39 is turned off, and the first regulator 36, that is, the load, is disconnected from the capacitor 35 (step S15).

Next, the AC power supply 50 of the electric power receiving apparatus 30A outputs a test signal (sine wave) for measurement under the control of the main control unit 47. The frequency Freq of the test signal at this time is set to an initial value ($f_1$) (step S16).

The main control unit 23 of the electric power transmission apparatus 10 stops the electric power transmission (transmission of a carrier signal) to the electric power receiving apparatus 30A (step S17). The waiting time period from the electric power transmission start in step S13 until the electric power transmission stop in step S17 is the same as or more than the time period that is necessary for the capacitor 35 to be charged with at least the necessary electric power (electric power necessary Q value measurement at one frequency).

The main control unit 47 of the electric power receiving apparatus 30A stops electric power reception as a result of the electric power transmission having been stopped from the electric power transmission apparatus 10 (step S18).

Here, the main control unit 47 turns on the third switches 40 to 43, and 43' (step S19). As a result of the third switch 40 being turned on, the test signal of the frequency $f_1$, which is generated by the AC power supply 50, is supplied to the other end of the capacitor 33' through the third switch 40. Furthermore, as a result of the third switch 41 being turned on, the other end of the capacitor 33' is made to conduct with the input end of the amplifier 44A, and as a result of the third switch 42 being turned on, one end of the capacitor 33 is made to conduct with the input end of the amplifier 44B.

Then, the main control unit 47 causes the amplifier 44A, the envelope detection unit 45A, and the ADC 46A to detect the voltage V1' at the other end of the capacitor 33', and records the voltage V1' in the memory 48. Similarly, the main control unit 47 causes the amplifier 44B, the envelope detection unit 45B, and the ADC 46B to detect the voltage V2 at one end of the capacitor 33, and records the voltage V2 in the memory 48 (step S20).

After the voltages V1' and V2 when the frequency of the test signal is $f_1$ are obtained, the main control unit 47 turns off the third switches 40 to 43, and 43' (step S21).

Here, the main control unit 23 of the electric power transmission apparatus 10 starts again the electric power transmission to the electric power receiving apparatus 30A (step S22). The waiting time period from the electric power transmission stop in step S17 until the electric power transmission start in step S22 is the same as or more than the time period necessary to at least detect and record the voltages V1' and V2. Then, after the main control unit 23 of the electric power transmission apparatus 10 restarts the electric power transmission to the electric power receiving apparatus 30A in step S22, the process proceeds to step S17 after the waiting time period for the charging in the capacitor 35 has passed, and the main control unit 23 stops the electric power transmission again. The waiting time period from the electric power transmission start in step S22 until the electric power transmission stop in step S17 is the same as or more than the time period necessary for the capacitor 35 to be charged with at least necessary electric power.

In response to the restart of the electric power transmission of the electric power transmission apparatus 10, the main control unit 47 of the electric power receiving apparatus 30A starts the electric power reception from the electric power transmission apparatus 10 and charges the capacitor 35 (step S23). During the waiting time period of the charging of the capacitor 35, the AC power supply 50 of the electric power receiving apparatus 30A outputs the test signal of the next frequency Freq under the control of the main control unit 47 (step S24). The frequency Freq of the test signal at this time is set to f.sub.2.

After the process of step S24 is completed, the main control unit 47 of the electric power receiving apparatus 30A proceeds to step S18 after the waiting time period of the charging of the capacitor 35 has passed, and the main control unit 47 stops electric power reception due to that electric power transmission is stopped from the electric power transmission apparatus 10. Then, the main control unit 47 continues processing subsequent to step S19, and performs Q value measurements using the test signal of the frequency f.sub.2 so as to obtain the voltages V1' and V2.

During the time period from the electric power reception stop in step S18 until the electric power reception start in step S23 (steps S19 to S21), blocks of the detection circuit operate with only the electric power that has been charged in the capacitor 35.

When a process (frequency sweep) for obtaining the voltages V1' and V2 for each test signal of a plurality of frequencies is completed, the main control unit 47 of the electric power receiving apparatus 30A turns off the first switch 38 so as to disconnect the capacitor 35 from the detection circuit (step S25). Next, the main control unit 47 of the electric power receiving apparatus 30A controls the AC power supply 50 so as to stop the output of the test signal (step S26).

Then, the main control unit 47 of the electric power receiving apparatus 30A responds with the first Q value measurement command from the electric power transmission apparatus 10. As a response, a measured data group (Freq, V1, V2) obtained by using the threshold value used for the determination as to the presence or absence of metal foreign matter, which is stored in the memory 48, and test signals of a plurality of frequencies, are sent back to the electric power transmission apparatus 10 through the communication control unit 49 (step S27).

In the flowchart shown in FIG. 18, while the capacitor 35 is being charged, the second switch 39 is turned off, and the first regulator 36 (load) is disconnected from the capacitor 35 (see step S15). Alternatively, electric power may be supplied to the load while the capacitor 35 is being charged. Stopping the electric power supply (charging of the capacitor 35) may be at least at the time of Q value measurement (in particular, at the time of the detection of voltages V1' and V2). While communication is being performed and charging is being performed in the capacitor 35, electric power supply may be either continued or stopped. This also applies in the flowchart of FIG. 21 (to be described later).

After the process of step S27, the electric power transmission apparatus 10 receives the threshold value and the measured data group (Freq, V1', V2) from the electric power receiving apparatus 30A, and stores them in the memory 24 (step S28).

Figure 20:
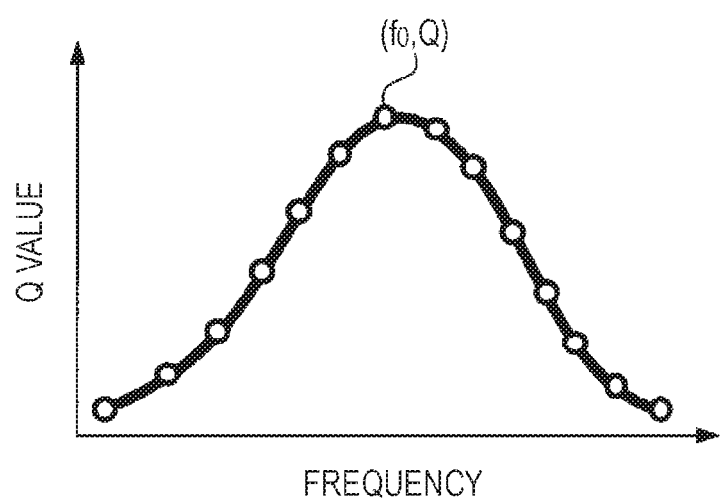
FIG. 20 is a graph illustrating an example of the relationship between a plurality of frequencies and Q values in a resonance circuit.

Then, on the basis of Equation (1), the computation processing unit 23A of the electric power transmission apparatus 10 calculates the Q value of the secondary side on the basis of the voltages V1' and V2 for each frequency Freq of the test signal received from the electric power receiving apparatus 30A, generates a table of frequencies and Q values, and stores the table in the memory 24. The relationship between the frequencies and the Q values of the test signal is expressed as a graph in FIG. 20. The highest Q value (Q_Max) on the secondary side is determined (step S29). In the example of FIG. 11, the Q value at the frequency f.sub.0 in the vicinity of the local maximum value of the frequency characteristic curve of the Q value becomes Q_Max.

Next, the determination unit 23B of the electric power transmission apparatus 10 compares Q_Max with the threshold value stored in the memory 24 so as to determine whether or not Q_Max is lower than the threshold value (step S30).

When Q_Max is lower than the threshold value in the determination process of step S30, the determination unit 23B determines that there is metal foreign matter (step S5 in FIG. 17), and performs an ending process. On the other hand, if Q_Max is not lower than the threshold value, the determination unit 23B determines that there is no metal foreign matter (step S5 in FIG. 17), and the process proceeds to step S6.

For example, in a case where a measurement result has been obtained such that there is an amount of change in a Q value of at least 25% between when there is no metal foreign matter and when there is metal foreign matter is obtained, as an example, a value such that 25% is subtracted from the Q value when there is foreign matter metal may be set as a threshold value. Regarding this threshold value, since the amount of change in the Q value changes with on the configuration of the electric power receiving apparatus, the environment, the size and the type of the metal foreign matter to be detected, and the like, it is preferable that the threshold value be set as appropriate in accordance with the measurement target.

Example in which Q Value Calculations of Second and Subsequent Times is Performed on Primary Side Next, a description will be given of processing in a case where Q value calculations (process in step S3) of second and subsequent times are performed on the primary side. In this example, a case in which a second Q value measurement after frequency sweep is performed is performed will be described. The same also applies to Q value measurements at third and subsequent times.

Figure 21:
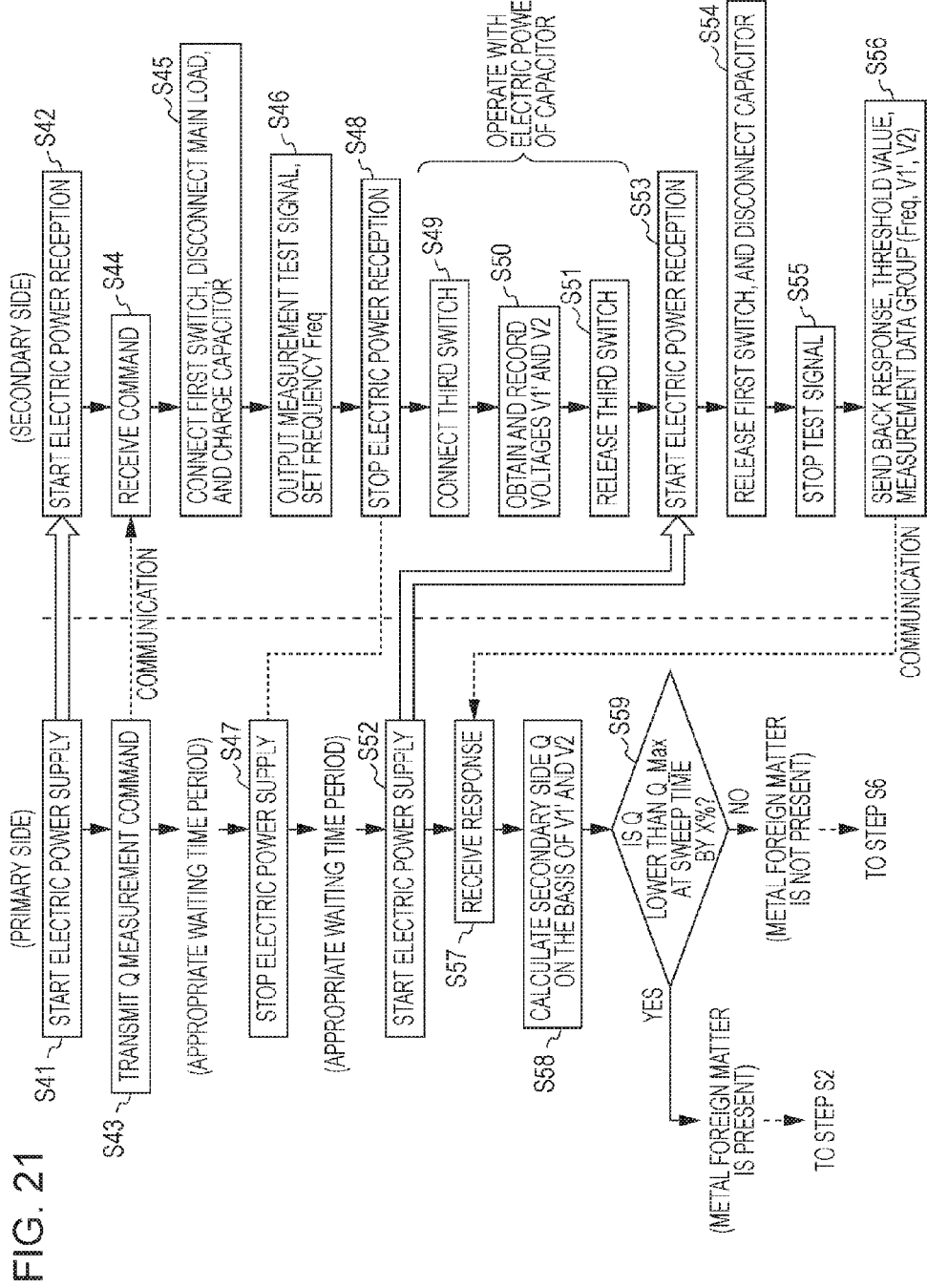
FIG. 21 is a flowchart illustrating processing in a case where a Q value calculation is performed in the primary side (electric power transmission apparatus)

FIG. 21 is a flowchart illustrating processing in a case where a Q value calculation is performed on the primary side (electric power transmission apparatus).

The processing of steps S41 to S55 of FIG. 21 corresponds to the processing of steps S11 to S26 (excluding step S24) of FIG. 18. In the following, differences between FIG. 18 and FIG. 21 will be mainly described.

When the electric power transmission process starts in steps S41 and S42, the main control unit 23 of the electric power transmission apparatus 10 transmits the second Q value measurement command to the electric power receiving apparatus 30A through the communication control unit 25 (step S43). The main control unit 47 of the electric power receiving apparatus 30A receives the second Q value measurement command from the electric power transmission apparatus 10 through the communication control unit 49 (step S44).

As an example, the second Q value measurement command is transmitted at the start of the second Q value measurement period (see FIG. 19). The second Q value measurement period is divided into four periods, namely, "charging", "Q value measurement at frequency f.sub.0", "charging", and "communication with primary side". The main control unit 47 of the electric power receiving apparatus 30A switches on/off of the first switch 38, the second switch 39, and the third switches 40 to 43 and 43 in such a manner as to correspond to these four periods.

When the main control unit 47 of the electric power receiving apparatus 30A receives the second Q value measurement command, the main control unit 47 turns on the first switch 38, so that the capacitor 35 is connected to the detection circuit and is charged. At this time, the main control unit 47 turns off the second switch 39, so that the first regulator 36, that is, the load, is disconnected from the capacitor 35 (step S45).

Next, the AC power supply 50 of the electric power receiving apparatus 30A outputs a test signal (sine wave) for measurement under the control of the main control unit 47. The frequency Freq of the test signal at this time is set to a frequency $f_0$ (.apprxeq.resonance frequency) when the highest Q value (Q_Max) was obtained in the previous frequency sweep process (step S46).

The main control unit 23 of the electric power transmission apparatus 10 stops the electric power transmission (transmission of a carrier signal) to the electric power receiving apparatus 30A (step S47). The waiting time period from the electric power transmission start in step S43 until the electric power transmission stop in step S47 is the same as or more than the time period necessary for the capacitor 35 to be charged with at least necessary electric power (electric power necessary for Q value measurement at one frequency).

The main control unit 47 of the electric power receiving apparatus 30A stops the electric power reception because the electric power transmission has been stopped from the electric power transmission apparatus 10 (step S48).

Here, the main control unit 47 turns on the third switches 40 to 43 (step S49). Then, the main control unit 47 detects the voltage V1' at the other end of the capacitor 33', records the voltage V1' in the memory 48, and similarly, detects the voltage V2 at one end of the capacitor 33, and records the voltage V2 in the memory 48 (step S50). After the voltages V1' and V2 when the frequency of the test signal is $f_0$ are obtained, the main control unit 47 turns off the third switches 40 to 43, and 43' (step S51).

Here, the main control unit 23 of the electric power transmission apparatus 10 starts the electric power transmission to the electric power receiving apparatus 30A again (step S52). The waiting time period from the electric power transmission stop in step S47 until the electric power transmission start in step S52 is the same as or more than the time period necessary for the voltages V1' and V2 to be at least detected and recorded. In FIG. 18, after the electric power transmission to the electric power receiving apparatus 30A restarts, the electric power transmission is stopped again after the waiting time period of the charging of the capacitor 35 has passed. However, in this example, the electric power transmission stop for the second time is not performed because it is sufficient that measured data when the frequency of the test signal is $f_0$ can be obtained.

In response to the restart of the electric power transmission of the electric power transmission apparatus 10, the main control unit 47 of the electric power receiving apparatus 30A starts the electric power reception from the electric power transmission apparatus 10, and charges the capacitor 35 (step S53).

In FIGS. 9A, 9B, and 9C, in the waiting time period of the charging of the capacitor 35, the output (see step S24) of the test signal at the next frequency Freq ($f_2$) is performed; however, in this example, the output of the test signal is not performed.

In the case where the process for obtaining the voltages V1' and V2 when the frequency of the test signal is $f_0$ is completed, the main control unit 47 of the electric power receiving apparatus 30A turns off the first switch 38 so as to disconnect the capacitor 35 from the detection circuit (step S54). Next, the main control unit 47 of the electric power receiving apparatus 30A controls the AC power supply 50 so as to stop the output of the test signal (step S55).

Then, the main control unit 47 of the electric power receiving apparatus 30A responds with the second Q value measurement command from the electric power transmission apparatus 10. As a response, the main control unit 47 sends back the threshold value used for the determination as to the presence or absence of metal foreign matter, which has been stored in the memory 48, and the measured data group ($f_0$, V1', V2) when the frequency of the test signal is $f_0$, to the electric power transmission apparatus 10 through the communication control unit 49 (step S56).

The electric power transmission apparatus 10 receives the threshold value and the measured data group ($f_0$, V1', V2) from the electric power receiving apparatus 30A, and stores them in the memory 24 (step S57).

Then, in accordance with Equation (1), the computation processing unit 23A of the electric power transmission apparatus 10 calculates the Q value on the secondary side on the basis of the voltages V1' and V2, which have been obtained in the case of the test signal of the frequency $f_0$ received from the electric power receiving apparatus 30A (step S58).

Next, the determination unit 23B of the electric power transmission apparatus 10 compares the calculated Q value on the secondary side with the Q_Max at the time of frequency sweep, which has been stored in the memory 24, so as to determine whether or not the Q value falls within a predetermined range of Q_Max. As a specific example, it is determined whether or not the Q value is lower than Q_Max by X % (step S59). That is, Q_Max at the previous frequency sweep is used as a standard Q value so as to detect metal foreign matter.

In the determination process of step S59, when the Q value is lower than Q_Max by X % or more, the determination unit 23B determines that metal foreign matter is possibly present (step S4 in FIG. 17), and the process proceeds to step S2. On the other hand, when the Q value is not lower than Q_Max by X %, the determination unit 23B determines that metal foreign matter is not present (step S4 in FIG. 17), and the process proceeds to step S6.

In the determination process, the reason when the Q value is lower than Q_Max by X % or more, it is determined that the metal foreign matter may be "present" is that, as has already been described, a frequency offset may have occurred due to that the positional relationship between the primary side coil and the secondary side coil has changed. That is, at the time of the second Q value measurement, the frequency may be shifted from the resonance frequency $f_0$ obtained at the first Q value measurement (frequency sweep). Therefore, there is a probability that the value of the Q value markedly differs between the Q value (Q_Max) in the case of the resonance frequency $f_0$ obtained by the first Q value measurement (frequency sweep) and the second Q value measurement using the resonance frequency $f_0$.

Hence, when the Q value is lower than Q_Max by X % or more in the second Q value measurement, it is determined that metal foreign matter is possibly present, and the process proceeds to step S2, where the frequency sweep process is performed once more, so that a more certain determination as to the presence or absence of metal foreign matter is performed.

Modification

Example in which Q Value Calculation is Performed on Secondary Side

In the examples of FIGS. 18 and 21, the threshold value used for the determination as to the presence or absence of metal foreign matter and the measured data group (f.sub.0, V1', V2) when the frequency of the test signal is f.sub.0 are transmitted from the electric power receiving apparatus 30A (secondary side) to the electric power transmission apparatus (primary side) 10. Then, in the electric power transmission apparatus 10, the Q value is calculated on the basis of the voltages V1' and V2 of the measured data group, and the Q value is compared with the threshold value so as to determine the presence or absence of metal foreign matter.

However, the electric power receiving apparatus 30A may measure the Q value on the basis of the measured data group (f.sub.0, V1', V2) when the frequency of the test signal is f.sub.0, and may compare the Q value with the threshold value so as to determine the presence or absence of metal foreign matter. That is, only the determination result of the presence or absence of metal foreign matter is transmitted to the electric power transmission apparatus 10 from the electric power receiving apparatus 30A.

As shown in FIG. 18, when the electric power transmission apparatus 10 (primary side) calculates the Q value and determines the presence or absence of metal foreign matter, there is advantage that the electric power receiving apparatus 30A (secondary side) is not necessary to have hardware of a computation processing unit and a determination unit. For example, a reduction in size, a lighter weight, and cost reduction of a portable device used as the electric power receiving apparatus 30A can be expected.

On the other hand, when the electric power receiving apparatus 30A calculates a Q value and determines the presence or absence of metal foreign matter, it is necessary for the electric power receiving apparatus 30A to have hardware of a computation processing unit and a determination unit. However, since the information on the determination result such that metal foreign matter is present or metal foreign matter is not present is only sent to the electric power transmission apparatus 10, the amount of information is small and the reduction in the communication time period can be expected.

2. Second Embodiment

Figure 22:
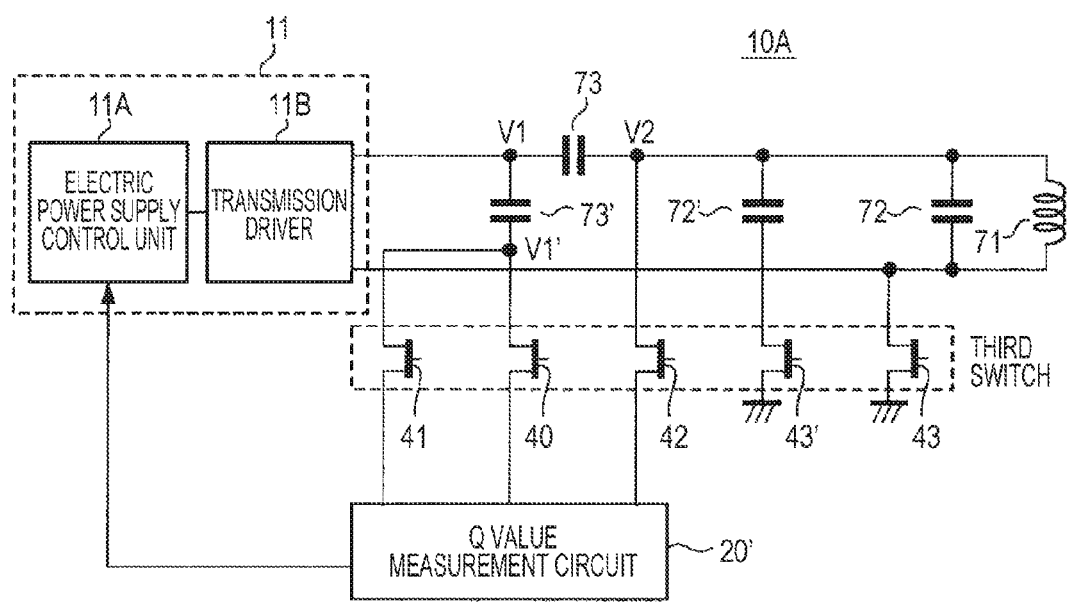
FIG. 22 is a block diagram illustrating the main portion of an example of the internal configuration of an electric power transmission apparatus (primary side) according to a second exemplary embodiment of the present disclosure.

FIG. 22 is a block diagram illustrating the main portion of an example of the internal configuration of an electric power transmission apparatus (primary side) that switches the configuration (constant) of a resonance circuit between electric power supply time and Q value measurement time according to a second exemplary embodiment of the present disclosure.

In the electric power transmission apparatus 10A according to the present embodiment, the same configuration as that of the resonance circuit of the electric power receiving apparatus 30A (see FIG. 6) is applied to the electric power transmission apparatus 10 shown in FIG. 5. That is, capacitors 72, 72', 73, and 73' forming the resonance circuit of the electric power transmission apparatus 10A correspond to the capacitors 32, 32', 33, and 33' forming the resonance circuit of the electric power receiving apparatus 30A.

The third switches 40 to 43, and 43' used for the electric power receiving apparatus 30A are connected to this resonance circuit, and also the third switches 40 to 42 are connected to the Q value measurement circuit 20'.

In contrast with the Q value measurement circuit 20, the Q value measurement circuit 20' includes the AC power supply (oscillation circuit), the resistance element, and the amplifier shown in FIG. 6 (illustrations of all of which are omitted), and supplies an alternating-current signal (sine wave) to one end of the capacitor 73 through the third switch 40. The third switches 41 and 42 are connected to the rectifying units 21A and 21B of the Q value measurement circuit 20', respectively.

The Q value measurement circuit 20' (main control unit 23) controls on/off of the third switches 40 to 43 and 43' so as to switch the configuration of the resonance circuit between electric power supply time and Q value measurement time, and the Q value measurement circuit 20' measures the voltage V1' and the voltage V2 at the time of electric power supply.

The signal source 11 includes an electric power transmission apparatus unit 21 for outputting a control signal used to control the generation of an alternating-current signal, and an electric power transmission driver 22 for generating and outputting an alternating-current signal of a given frequency on the basis of the control signal of the electric power transmission apparatus unit 21. The electric power transmission apparatus unit 21 and the electric power transmission driver 22 output an alternating-current signal to the outside through the primary side coil 71 of the resonance circuit at a time that is not at least the Q value measurement time.

When the third switch and the Q detection measurement circuit, which are provided in the electric power transmission apparatus, are to be operated, for the power supply therefor, an alternating-current signal that is output by the signal source 11 or the stored electric power of a battery (not shown) included in the electric power transmission apparatus, or the like can be used.

Figure 23:
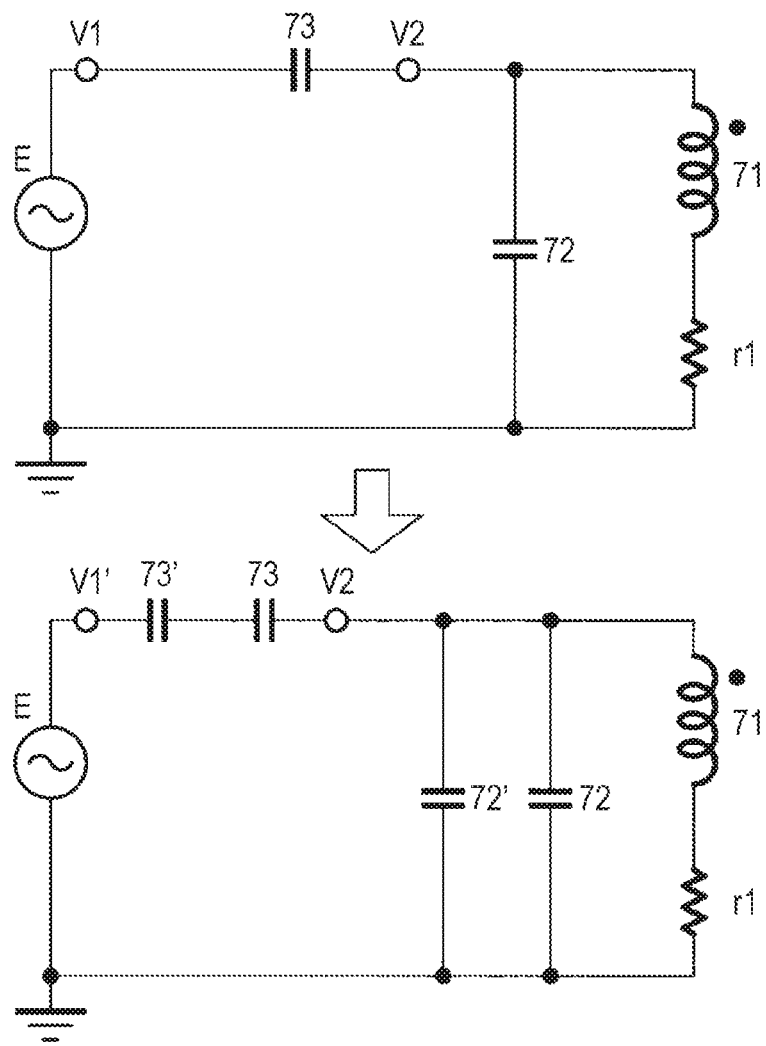
FIG. 23 is an equivalent circuit diagram illustrating the configuration of a resonance circuit when a third switch of the electric power transmission apparatus (primary side) shown in FIG. 22 is turned on and off.

FIG. 23 is an equivalent circuit diagram illustrating the configuration of a resonance circuit when the third switch of the electric power transmission apparatus 10A is turned on and off.

In the present exemplary embodiment, the third switch is turned off at electric power supply time, and the primary side coil 71, and the capacitors 72 and 73 constitute a resonance circuit (the upper side in FIG. 23).

On the other hand, the third switch is turned on at Q value measurement time, a capacitor 72' is further connected in parallel to the capacitor 72 in parallel with the primary side coil 71, and a capacitor 73' is further connected to the capacitor 73 in series with the primary side coil 71 (the lower side in FIG. 23).

By assuming that the above-mentioned 8-turns coil is used for the primary side coil 71, the constants of the resonance circuit were calculated when the third switches 40 to 43 and 43' were on and off.

When the third switches 40 to 43 and 43' were off, the results were obtained in which the resonance frequency of the resonance circuit was 121.6 kHz, the impedance of the resonance circuit at the resonance point was 0.7.OMEGA., and the Q value was 50. The conditions used for trial calculations are: the amplitude of the AC voltage is 0.1V, the self-inductance of the primary side coil 71 of the resonance circuit is 14.3.mu.H, the resistance value of the effective resistance component r1 is 0.6.OMEGA., and the electrostatic capacitance values of the capacitors 72 and 73 are 10 nF and 110 nF, respectively.

On the other hand, when the third switches 40 to 43 and 43' were on, the results were obtained in which the resonance frequency of the resonance circuit was 227.5 kHz, the impedance of the resonance circuit at the resonance point was 8.3.OMEGA., and the Q value was 82.

The electrostatic capacitance values of the capacitors 72' and 73' were 15 nF and 10 nF, respectively, and the other conditions were the same as those described above.

In the present embodiment, similarly to the first embodiment, by appropriately switching the third switches 40 to 43 and 43', it is possible to prevent the measurement signal (sine wave signal) that is output by the AC power supply of the secondary side, which is used for the Q value measurement, from interfering with the electric power supply signal supplied from the primary side, and it is possible to calculate a highly accurate Q value.

Moreover, by making the configuration of the resonance circuit at the time of electric power supply and the configuration of the resonance circuit at the time of metal foreign matter detection by using Q value measurement to be optimal configurations (constant: electrostatic capacitance value), it is possible to improve the detection accuracy of metal foreign matter without deteriorating electric power supply performance.

Furthermore, similarly to the first embodiment, not limited to the magnetic-field resonance method, the second embodiment can also be applied to an electromagnetic induction method in which a coupling coefficient k is high and the Q value is minimized.

Also, in the present embodiment, the second embodiment can be applied to all of the cases in which the connection form of the capacitor to the coil of the resonance circuit is (1) series connection to the coil; (2) series connection to the coil after parallel connection; and (3) parallel connection to the coil.

In the examples of FIGS. 16, 22, and 23, by switching the circuit configuration of the resonance circuit, the resonance frequency of the resonance circuit is increased, and the impedance is also increased. In contrast, as shown in FIGS. 9A, 9B, and 9C to 12, only the impedance of the resonance circuit may be changed without changing the resonance frequency of the resonance circuit.

In addition, in the examples of FIGS. 16, 22, and 23, a case has been described in which the capacitance of the capacitor forming the resonance circuit is changed. Alternatively, the self-inductance of the coil forming the resonance circuit may be changed.

In that case, for example, by using a tapped coil for a coil, by switching the tap or selecting a tap between the electric power supply time and Q value measurement time by the circuit switching unit under the control of the main control unit 23, and by thereby changing the coil that substantially forms the resonance circuit, the self-inductance of the coil of the resonance circuit is changed. Alternatively, the coil itself may be switched to another coil.

3. Others

First Example

In the above-described first and second exemplary embodiments, the Q value measurement circuit 60 (computation processing unit 47A) and the Q value measurement circuit 20' (computation processing unit 23A) obtain a Q value on the basis of the voltage V1' between the coil of the capacitor of the resonance circuit and the voltage V2 across the coil. In the present exemplary embodiment, the Q value is obtained in accordance with a half-power band width method.

Figure 24:
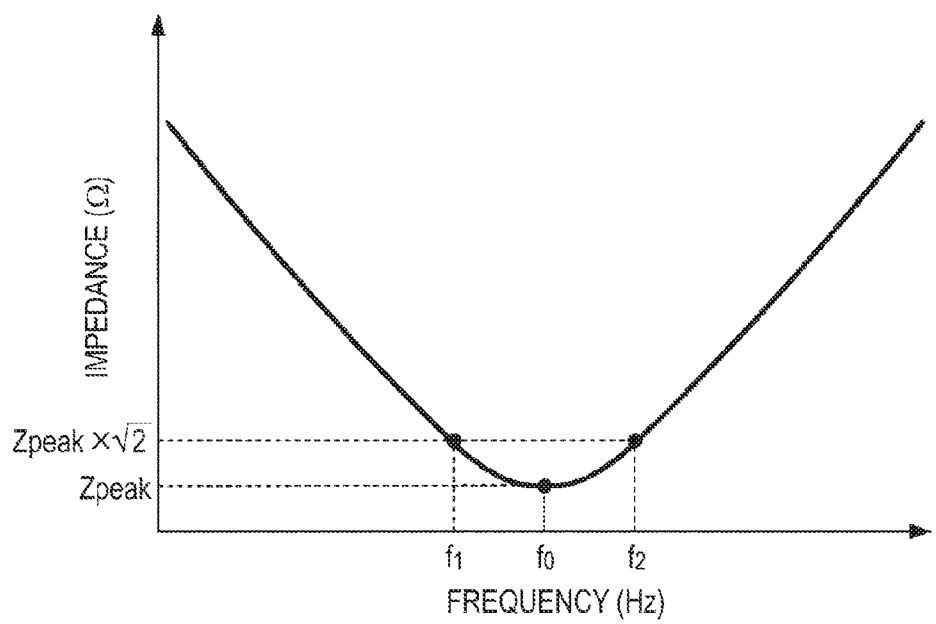
FIG. 24 is a graph illustrating frequency characteristics of impedance in a series resonance circuit.

In the half-power band width method, in a case where a series resonance circuit is configured, the Q value is obtained by Equation (9) below on the basis of the band (frequencies f1 to f2), which is at impedance 2 times the absolute value of the impedance (Zpeak) at the resonance frequency f0, as shown in the graph of FIG. 24.

$$Q = f0/f2 - f1 \quad (9)$$

Figure 25:
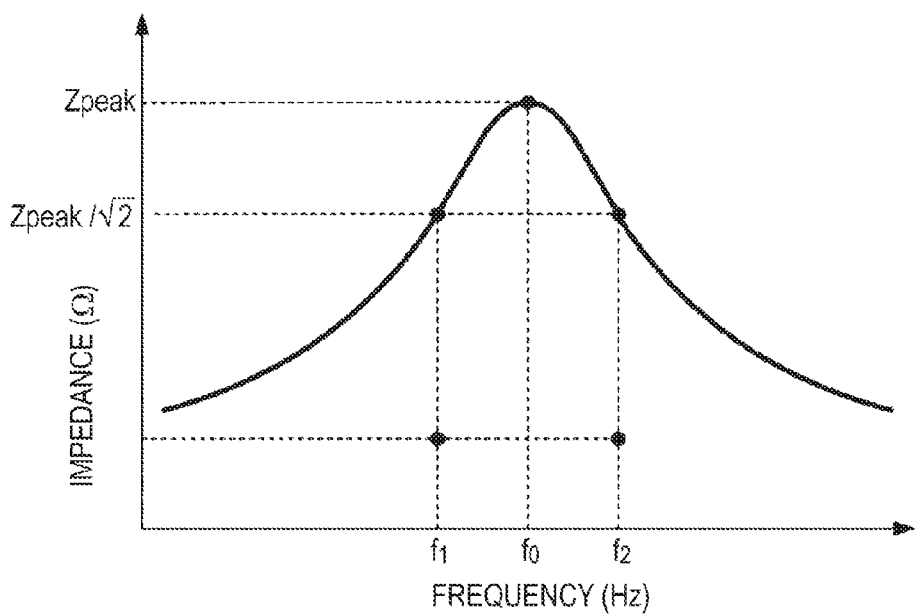
FIG. 25 is a graph illustrating frequency characteristics of impedance in a parallel resonance circuit.

Furthermore, in a case where a parallel resonance circuit is configured, as shown in the graph of FIG. 25, the Q value is obtained by Equation (9) on the basis of the band (frequencies f1 to f2), which is at impedance 1/2 times the absolute value of the impedance (Zpeak) at the resonance frequency f0.

Second Example

Unlike the first and second exemplary embodiments, the present exemplary embodiment is an example in which the computation processing units 47A and 23A calculate a Q value on the basis of the ratio of the real part components of the impedance of the resonance circuit to the imaginary part components. In this example, the real part components and the imaginary part components of the impedance are obtained by using an automatic balanced bridge circuit and a vector ratio detection unit.

Figure 26:
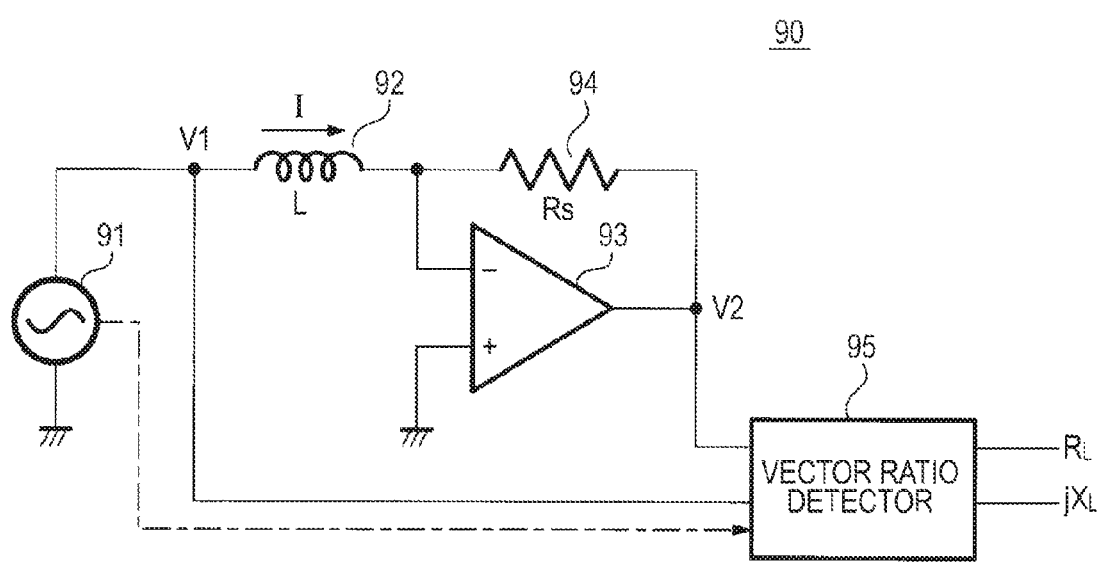
FIG. 26 is a circuit diagram for calculating a Q value on the basis of the ratio of real part components and imaginary part components of impedance according to a third exemplary embodiment of the present disclosure.

FIG. 26 is a circuit diagram of an automatic balanced bridge circuit for calculating a Q value on the basis of the ratio of the real part components of the impedance to the imaginary part components thereof.

An automatic balanced bridge circuit 90 shown in FIG. 26 is configured the same as a generally used inverting amplification circuit. A coil 92 is connected to the inverting input terminal (−) of an inverting amplifier 93, and a non-inverting input terminal (+) thereof is connected to the ground. Then, a feedback resistance element 94 applies negative feedback to the inverting input terminal (−) from the output terminal of the inverting amplifier 93. Furthermore, the automatic balanced bridge circuit 90 inputs the output (voltage V1') of the AC power supply 91 that inputs an alternating-current signal to the coil 92, and the output (voltage V2) of the inverting amplifier 93 to a vector ratio detection unit 95. The coil 92 corresponds to the secondary side coil 31 of FIG. 16 or the primary side coil 71 of FIG. 22.

The automatic balanced bridge circuit 90 operates in such a manner that the voltage of the inverting input terminal (−) is typically zero due to the action of negative feedback. Furthermore, almost all the electric current that flows through the AC power supply 91 to the coil 92 flows to the feedback resistance element 94 because the input impedance of the inverting amplifier 93 is large. As a result, the voltage applied to the coil 92 becomes the same as the voltage V1' of the AC power supply 91 and also, the output voltage of the inverting amplifier 93 becomes the product of the electric current I flowing through the coil 92 and the feedback resistance value Rs. The feedback resistance value Rs is a commonly used reference resistance value. Therefore, when the voltage V1' and the voltage V2 are detected and the ratio thereof is calculated, the impedance is obtained. In order to obtain the voltage V1' and the voltage V2 as complex numbers, the vector ratio detection unit 95 uses the phase information (short dashed line) of the AC power supply 91.

In this example, by using such an automatic balanced bridge circuit 90, the vector ratio detection unit 95, and the like, the real part components $R_L$ and the imaginary part components $X_L$ of the impedance $Z_L$ of the resonance circuit are obtained, and a Q value is obtained on the basis of the ratio thereof. Equation (10) and Equation (11) below are calculation equations showing the processes of obtaining the Q value.

$$ZL=RL+jXL=V1I=V1V2Rs(10)Q=XLRL(11)$$

In the first and second exemplary embodiments, a description has been given by assuming the non-contact electric power transmission system of a magnetic-field resonance method. However, as has already been described, the present disclosure is not limited to the magnetic-field resonance method, and can also be applied to an electromagnetic induction method in which the coupling coefficient k is high and the Q value is minimized.

Furthermore, the electric power receiving apparatus may include an electric power transmission unit and may transmit electric power to the electric power transmission apparatus through a secondary side coil in a non-contact manner. Alternatively, the electric power transmission apparatus may include a load, and may receive electric power from the electric power receiving apparatus through an electric power transmission coil in a non-contact manner.

Furthermore, in the first embodiment, an example has been described in which Q value measurement is performed by using small electric power that is charged in the capacitor 35 of the electric power receiving apparatus 30A. Alternatively, since it is sufficient that the configuration of the resonance circuit is switched between electric power supply time and Q value measurement time, Q value measurement may be performed by using the electric power of the battery. In this case, the capacitor 35 is unnecessary.

Furthermore, in the first and second exemplary embodiments, the Q value at the resonance frequency is measured. However, the frequency at which the Q value is measured may not necessarily match the resonance frequency. Even in the case where the Q value is measured by using a frequency offset from the resonance frequency to a permissible range, use of the technology of the present disclosure makes it possible to improve the accuracy of detection of metal foreign matter that is present between the electric power transmission side and the electric power receiving side.

Furthermore, as a conductor, such as a metal, approaches a primary side coil or a secondary side coil, not only the Q value, but also the L value changes, and the resonance frequency is offset. By using together the amount of offset of the resonance frequency due to a change in the L value, and the Q value, an electromagnetically coupled state may be detected.

Furthermore, when metal foreign matter is sandwiched between a primary side coil and a secondary side coil, the coupling coefficient k value also changes. In order to detect an electromagnetically coupled state, the changes in the coupling coefficient k value and the Q value may be used together.

Furthermore, in the first and second exemplary embodiments of the present disclosure, a description has been given of a coil not having a core as a primary side coil and a secondary side coil. Alternatively, a coil that is constructed to be wound around a core having a magnetic substance may be adopted.

In addition, in the first and second exemplary embodiments of the present disclosure, an example has been described in which a mobile phone is applied to a portable device on the secondary side. Not limited to this example, the mobile phone can be applied to various portable devices for which electric power is necessary, such as a portable music player or a digital still camera.

The present disclosure can take the following configurations.

[1] An energy receiver to receive energy in a wireless manner from an energy transmitter, said energy receiver comprising: a resonance circuit including at least an inductor, a first capacitor, and a second capacitor; and a Q-value circuit connected to the resonance circuit, the Q-value circuit being configured to obtain a first voltage taken at a first node of the resonance circuit and a second voltage taken at a second node of the resonance circuit, wherein, the first and second capacitors are connected in series between the first and second nodes.

[2] The energy receiver of [1] above, wherein the Q-value circuit includes: a computing section to compute a Q-value based on the first and second voltages, the Q-value being a ratio of the first voltage relative to the second voltage; and a control section to compare the Q-value with a threshold value to determine if foreign matter is in a space affecting the wireless reception of energy.

[3] The energy receiver of [1] above, further comprising: a switching section having a plurality switches to selectively connect the resonance circuit to the Q-value circuit, wherein, the Q-value circuit includes a control section that is configured to control the switching section such that electric power is received by the energy receiver at a different time than when the first and second voltages are obtained, and the Q-value circuit is configured to detect an electromagnetically coupled state of at least the inductor.

[4] The energy receiver of [3] above, wherein: the switching section is operable to switch to a state in which an electrostatic capacitance value of the resonance circuit is decreased.

[5] The energy receiver of [3] above, wherein: the energy receiver is configured to switch from a first resonance frequency to a second resonance frequency, and increase impedance of the resonance circuit.

[6] The energy receiver of [3] above, wherein: the inductor is a tapped coil, and the switching section is configured to select a tap of the tapped coil.

[7] The energy receiver of [3] above, further comprising: third and fourth capacitors, wherein, the third capacitor is coupled to the inductor, the fourth capacitor is coupled between first ends of each of the inductor and the third capacitor and a ground potential.

[8] The energy receiver of [7] above, wherein: the plurality of switches of the switching section include a first switch and a second switch, the first switch is coupled to the third capacitor and a ground potential, and the second switch is coupled between the fourth switch and the ground potential.

[9] The energy receiver of [7] above, wherein: the switching section is operable to switch to a state in which an electrostatic capacitance value of the resonance circuit is increased.

[10] A method to detect foreign matter in a space affecting wireless transmission of electric power from a transmitter to a receiver, said method comprising: receiving electric energy from a resonance circuit that includes at least an inductor, a first capacitor, and a second capacitor; and obtaining a first voltage taken at a first node of the resonance circuit and a second voltage taken at a second node of the resonance circuit, wherein, the first and second capacitors are connected in series between the first and second nodes.

[11] The method of [10] above, further comprising: comparing a ratio of the first and second voltages with a threshold value to determine if foreign matter is present in a space affecting wireless power transmission.

[12] The method of [11] above, further comprising: controlling a wireless transmission of electric power based on a result of said comparison of the ratio to the threshold value.

[13] An energy transmitter to transmit energy in a wireless manner to an energy receiver, said energy transmitter comprising: a resonance circuit including at least an inductor, a first capacitor, and a second capacitor; and a Q-value circuit connected to the resonance circuit, the Q-value circuit being configured to determine a relationship of a first voltage taken at a first node relative to a second voltage taken at a second node, wherein, the first and second capacitors are connected in series between the first and second nodes.

[14] The energy transmitter according to [13] above, wherein the Q-value circuit includes a control section that is configured to compare the relationship of the first voltage and the second voltage with a threshold value to determine if foreign matter is affecting reception of the wireless energy transmission.

[15] The energy transmitter according to [13] above, further comprising: a switching section having a plurality switches to selectively connect the resonance circuit to the Q-value circuit, wherein, the Q-value circuit includes a control section that is configured to control the switching section such that energy transmission occurs at a different time than when the first and second voltages are obtained.

[16] The energy transmitter according to [13] above, further comprising: third and fourth capacitors coupled to the inductor, wherein, the switching section includes first and second switches, the first switch is disposed between the third capacitor and a ground potential, and the second switch is disposed between the fourth capacitor and a ground potential.

[17] A detection device to detect foreign matter in a space affecting wireless electric power transmission, said detection device comprising: a circuit to determine a relationship of a first voltage taken at a first node relative to a second voltage taken at a second node, wherein, the circuit is connected to a resonance circuit that includes at least an inductor, a first capacitor, and a second capacitor, and the first and second capacitors are connected in series between the first and second nodes.

[18] A wireless electric power transmission system comprising: a transmitter to transmit electric energy; and a receiver to receive the electric energy transmitted by the transmitter, wherein one of the transmitter and the receiver includes: a resonance circuit including at least an inductor, a first capacitor, and a second capacitor, and a Q-value circuit connected to the resonance circuit, the Q-value circuit being configured to determine a relationship of a first voltage taken at a first node relative to a second voltage taken at a second node, wherein, the first and second capacitors are connected in series between the first and second nodes.

[19] A method for wireless power transmission between a transmitter and a receiver, said method comprising: receiving, via a resonance circuit, electric power wirelessly from the transmitter; obtaining, via a Q-value circuit, first and second voltages at respective first and second nodes of the resonance circuit, the first and second voltages being effective to determine if foreign matter is present in a space affecting wireless power transmission; and controlling a switching section between the Q-value circuit and the resonance circuit such that the electric power transmission occurs at a different time than when the first and second voltages are obtained.

[20] The method of [19] above, wherein: the resonance circuit includes an inductor and a first capacitor, and the first and second nodes are positioned across at least the first capacitor.

[21] A detection apparatus comprising: a resonance circuit including at least a coil and a capacitor; a detection unit configured to measure a Q value of the resonance circuit; a circuit switching unit configured to switch a circuit configuration of the resonance circuit between electric power supply time and Q value measurement time; and a control unit configured to control switching by the circuit switching unit.

[22] The detection apparatus according to [21] above, wherein the detection unit measures the Q value of the resonance circuit and detects an electromagnetically coupled state of the coil and the outside.

[23] The detection apparatus according to [22] above, wherein the circuit switching unit switches the circuit configuration of the resonance circuit between electric power supply time and Q value measurement time, and changes a resonance frequency of the resonance circuit.

[24] The detection apparatus according to [22] above, wherein the circuit switching unit switches the circuit configuration of the resonance circuit between electric power supply time and Q value measurement time, changes the resonance frequency of the resonance circuit, and increases impedance at the resonance frequency of the resonance circuit.

[25] The detection apparatus according to [22] above, wherein the circuit switching unit switches the circuit configuration of the resonance circuit between electric power supply time and Q value measurement time, and increases impedance at the resonance frequency of the resonance circuit.

[26] The detection apparatus according to [23] above, wherein the circuit switching unit changes an electrostatic capacitance value of electrostatic capacitance components of the resonance circuit at the time of Q value measurement.

[27] The detection apparatus according to [26] above, wherein the circuit switching unit changes the electrostatic capacitance value of the electrostatic capacitance components in parallel with and in series with the coil of the resonance circuit at the time of Q value measurement.

[28] The detection apparatus according to [26] above, wherein the circuit switching unit changes the electrostatic capacitance value of the electrostatic capacitance components in parallel with the coil of the resonance circuit at the time of Q value measurement.

[29] The detection apparatus according to [26] above, wherein the circuit switching unit changes the electrostatic capacitance value of the electrostatic capacitance components in series with the coil of the resonance circuit at the time of Q value measurement.

[30] The detection apparatus according to [27] above, wherein the circuit switching unit increases the electrostatic capacitance value of the electrostatic capacitance components in parallel with the coil at the time of Q value measurement.

[31] The detection apparatus according to [27] above, wherein the circuit switching unit decreases the electrostatic capacitance value of the electrostatic capacitance components in series with the coil at the time of Q value measurement.

[32] The detection apparatus detection apparatus according to [26] above, wherein the circuit switching unit switches a self-inductance of the coil of the resonance circuit at the time of Q value measurement.

[33] The detection apparatus according to [32] above, wherein: the coil is a tapped coil, and the circuit switching unit selects a tap of the tapped coil.

[34] The detection apparatus according to [26] above, wherein the resonance circuit is configured in such a manner that the capacitor is connected in series with the coil.

[35] The detection apparatus according to [26] above, wherein the resonance circuit is configured in such a manner that the capacitor is connected in parallel with the coil.

[36] The detection apparatus according to [26] above, wherein the resonance circuit is configured in such a manner that the capacitor is connected in parallel with the coil and another capacitor is connected in series with the coil.

[37] An electric power receiving apparatus comprising: a coil configured to receive electric power; a resonance circuit including at least the coil and a capacitor; a detection unit configured to measure a Q value of the resonance circuit; a circuit switching unit configured to switch a circuit configuration of the resonance circuit between electric power supply time and Q value measurement time; and a control unit configured to control switching by the circuit switching unit.

[38] An electric power transmission apparatus comprising: a coil configured to transmit electric power; a resonance circuit including at least the coil and a capacitor; a detection unit configured to measure a Q value of the resonance circuit; a circuit switching unit configured to switch a circuit configuration of the resonance circuit between electric power supply time and Q value measurement time; and a control unit configured to control switching by the circuit switching unit.

[39] A non-contact electric power transmission system comprising: an electric power transmission apparatus configured to transmit electric power in a wireless manner; and an electric power receiving apparatus configured to receive electric power from the electric power transmission apparatus, wherein the electric power transmission apparatus or the electric power receiving apparatus includes a resonance circuit including at least a coil and a capacitor, the coil being used for electric power transmission or electric power reception, a detection unit configured to measure a Q value of the resonance circuit, a circuit switching unit configured to switch a circuit configuration of the resonance circuit between electric power supply time and Q value measurement time, and a control unit configured to control switching by the circuit switching unit.

[40] A detection method comprising: switching, at the time of Q value measurement, a circuit configuration of a resonance circuit from a circuit configuration at the time of electric power supply, the resonance circuit including at least a coil and a capacitor, the resonance circuit being included in an electric power transmission apparatus or an electric power receiving apparatus forming a non-contact electric power transmission system; and measuring a Q value of the resonance circuit after the circuit configuration of the resonance circuit is switched.

The series of processing in the above-mentioned exemplary embodiments can be performed by hardware and can also be performed by software. When the series of processing is to be performed by software, it can be performed by a computer in which a program constituting the software is installed into specialized hardware or by a computer in which programs for performing various programs are installed. For example, a program forming desired software may be installed into a general-purpose personal computer, whereby the program is executed.

Furthermore, a recording medium having recorded thereon program code of software for realizing the functions of the above-described embodiments may be supplied to a system or an apparatus. Furthermore, when the computer (or a control device, such as a CPU) of the system or the apparatus reads the program code stored on a recording medium and executes the program code, of course, the functions can be realized.

For recording media for supplying program code in this case, for example, a flexible disk, a hard disk, an optical disc, a magneto-optical disc, a CD-ROM, a CD-R, a magnetic tape, a non-volatile memory card, or a ROM can be used.

Furthermore, by executing the program code read by the computer, the functions of the above-described embodiment are realized. Additionally, an OS or the like, which runs on the computer, performs part or the whole of the actual processing on the basis of the instructions of the program code. A case in which the processing realizes the functions of the above-described embodiments is also included.

In this specification, processing steps describing time-series processing may include, as well as processes executed in time series in accordance with the written order, processes executed in parallel or individually (for example, parallel processes or object-based processes), which may not necessarily be executed in time series.

As has been described above, the present disclosure is not limited to the above-described embodiments. Of course, other various modifications and application examples can be configured without departing from the gist described in the claims.

That is, since the embodiments described above are preferred examples of the present disclosure, various technically preferable restrictions have been added. However, the technical scope of the present disclosure is not limited to these embodiments unless otherwise indicated in the following description as limiting the present disclosure. For example, the used materials, the amounts thereof used, the processing time period, the processing sequence, numerical conditions of parameters, and the like, which are given in the foregoing description, are only preferred examples, and the dimensions, shapes, and arrangement relationship, which are used for description in each figure, are approximate.

The present disclosure contains subject matter related to that disclosed in Japanese Priority Patent Application JP 2011-162589 filed in the Japan Patent Office on Jul. 25, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A power transmission device comprising:
a resonance circuit including a coil and a capacitor;
communication circuitry configured to perform communication with a power reception device;
detection circuitry configured to measure a first Q-value of the resonance circuit;
control circuitry configured to supply an alternating current to the resonance circuit for the measurement of the Q-value and to control the detection circuitry to measure the first Q-value, in a state where the resonance circuit is not transmitting power; and
determination circuitry configured to receive an information received from the power reception device in response to a request from the communication circuitry, wherein the determination circuitry is configured to compare the first Q-value with a threshold value to determine whether a foreign object is in a space affecting the power transmission, and the threshold value is a second Q-value that is based on the information received from the power reception device.

2. The power transmission device according to claim 1, wherein the threshold value is based on the information received from the power reception device.

3. The power transmission device according to claim 1, wherein, in a case where the first Q-value is higher than or equal to the threshold value, the power transmission device transmits power to the power reception device.

4. The power transmission device according to claim 1, wherein, in a case where the first Q-value is less than the threshold value, the power transmission device does not transmit power to the power reception device.

5. The power transmission device according to claim 1, wherein the communication circuitry is configured to receive an instruction to determine whether the foreign object is in the space affecting the power transmission.

6. The power transmission device according to claim 1, wherein
the detection circuitry is configured to obtain a first voltage at a first node of the resonance circuit and a second voltage at a second node of the resonance circuit, wherein the capacitor is connected between the first node and the second node, and the detection circuitry includes:
computing circuitry configured to compute the first Q-value based on the first voltage and the second voltage, and the determination circuitry, wherein the determination circuitry is configured to compare the first Q-value with the threshold value to determine whether the foreign object is in the space affecting the power transmission.

7. The power transmission device according to claim 6, wherein the detection circuitry further comprises:
a first analog-to-digital converter configured to convert the first voltage to a first digital signal, and to output the first digital signal to the computing circuitry; and
a second analog-to-digital converter configured to convert the second voltage to a second digital signal, and to output the second digital signal to the computing circuitry.

8. The power transmission device according to claim 6, further comprising a memory configured to store the threshold value.

9. The power transmission device according to claim 6, wherein the first Q-value is a ratio of the first voltage to the second voltage.

10. The power transmission device according to claim 1, wherein the power transmission is a wireless power transmission.

11. An electronic apparatus comprising the power transmission device according to claim 1.

12. A power transfer system comprising:
a power transmission device; and
a power reception device,
wherein the power transmission device includes:
a resonance circuit including a coil and a capacitor,
communication circuitry configured to perform communication with the power reception device,
detection circuitry configured to measure a Q-value of the resonance circuit,
control circuitry configured to supply an alternating current to the resonance circuit for the measurement of the Q-value and to control the detection circuitry to measure the Q-value, in a state where the resonance circuit is not transferring power, and
determination circuitry configured to receive an information received from the power reception device in response to a request from the communication circuitry, wherein
the determination circuitry is configured to compare the first Q-value with a threshold value to determine whether a foreign object is in a space affecting the power transmission, and
the threshold value is a second Q-value that is based on the information received from the power reception device.

13. The power transfer system according to claim 12, wherein the threshold value is based on the information received from the power reception device.

14. The power transfer system according to claim 12, wherein, in a case where the Q-value is higher than or equal to the threshold value, the power transmission device transmits power to the power reception device.

15. The power transfer system according to claim 12, wherein, in a case where the Q-value is less than the threshold value, the power transmission device does not transmit power to the power reception device.

16. The power transfer system according to claim 12, wherein the communication circuitry is configured to receive an instruction to determine whether the foreign object is in the space affecting the power transmission.

17. The power transfer system according to claim 12, wherein the power transfer is a wireless power transfer.

* * * * *